US012353162B2

(12) United States Patent
Abe

(10) Patent No.: US 12,353,162 B2
(45) Date of Patent: Jul. 8, 2025

(54) DRUM CARTRIDGE HAVING SEPARATION SHAFT FOR MOVING DEVELOPING FRAME AWAY FROM PHOTOSENSITIVE DRUM

(71) Applicant: BROTHER KOGYO KABUSHIKI KAISHA, Nagoya (JP)

(72) Inventor: Koji Abe, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/193,236

(22) Filed: Mar. 30, 2023

(65) Prior Publication Data

US 2024/0280935 A1 Aug. 22, 2024

(30) Foreign Application Priority Data

Feb. 16, 2023 (JP) ................................ 2023-022411

(51) Int. Cl.
*G03G 21/18* (2006.01)
*G03G 15/08* (2006.01)

(52) U.S. Cl.
CPC ..... *G03G 21/1814* (2013.01); *G03G 15/0813* (2013.01); *G03G 21/1821* (2013.01); *G03G 21/1867* (2013.01); *G03G 2221/1684* (2013.01); *G03G 2221/1869* (2013.01)

(58) Field of Classification Search
CPC ........... G03G 21/1814; G03G 21/1821; G03G 2221/1684; G03G 2221/1869; G03G 21/1867; G03G 21/1871; G03G 15/0813
See application file for complete search history.

(56) References Cited

U.S. PATENT DOCUMENTS

| | | | | |
|---|---|---|---|---|
| 9,069,330 B2 * | 6/2015 | Souda | G03G 21/1671 | |
| 2008/0181658 A1 * | 7/2008 | Okabe | G03G 21/1814 | 399/111 |
| 2010/0067947 A1 * | 3/2010 | Yuzawa | G03G 15/087 | 399/119 |
| 2010/0166453 A1 * | 7/2010 | Okabe | G03G 15/0194 | 399/119 |
| 2019/0302682 A1 | 10/2019 | Wang et al. | | |
| 2020/0103816 A1 * | 4/2020 | Wang | G03G 21/1676 | |

(Continued)

FOREIGN PATENT DOCUMENTS

| | | |
|---|---|---|
| JP | 2019-179128 A | 10/2019 |
| JP | 2020-56817 A | 4/2020 |
| JP | 2021-170071 A | 10/2021 |

*Primary Examiner* — Stephanie E Bloss
*Assistant Examiner* — Laura Roth
(74) *Attorney, Agent, or Firm* — Merchant & Gould P.C.

(57) ABSTRACT

A drum cartridge includes a photosensitive drum and a drum frame holding the photosensitive drum. The drum frame is configured to hold a developing cartridge. The drum frame includes a first metal frame, a second metal frame, and a first resin frame between the first metal frame and the second metal frame. The developing cartridge includes a developing roller, a developing frame for holding the developing roller, and a separation shaft movable between a first position and a second position. The first resin frame includes a first guide configured to position the developing cartridge at an attachment position and a first separation contact surface configured to come into contact with the separation shaft when the separation shaft is located at the second position.

10 Claims, 19 Drawing Sheets

(56) References Cited

U.S. PATENT DOCUMENTS

| | | | | |
|---|---|---|---|---|
| 2020/0103817 | A1 | 4/2020 | Wang et al. | |
| 2020/0103821 | A1* | 4/2020 | Wang | G03G 21/1671 |
| 2021/0325811 | A1 | 10/2021 | Nakano et al. | |

* cited by examiner

DRUM CARTRIDGE HAVING SEPARATION SHAFT FOR MOVING DEVELOPING FRAME AWAY FROM PHOTOSENSITIVE DRUM

REFERENCE TO RELATED APPLICATIONS

This application claims priority from Japanese Patent Application No. 2023-022411 filed on Feb. 16, 2023. The entire content of the priority application is incorporated herein by reference.

BACKGROUND ART

A known a drum cartridge includes a photosensitive drum and is configured to hold a developing cartridge. The drum cartridge includes a separation member that separates a developing roller of the developing cartridge from the photosensitive drum while image formation is not performed.

DESCRIPTION

Preferably, the developing roller is accurately positioned with respect to the drum cartridge in the image forming apparatus when the developing roller and the photosensitive drum are brought into contact with each other after separated from each other.

An object of the present disclosure is to provide a drum cartridge including a drum frame that enables a developing cartridge to accurately move with respect to the drum frame during a separation operation.

According to an aspect of the present disclosure, a drum cartridge includes a photosensitive drum and a drum frame. The photosensitive drum is rotatable about a drum axis extending in an axial direction. The drum frame holds the photosensitive drum. The drum frame holds a developing cartridge. The drum frame includes a first metal frame, a second metal frame, and a first resin frame. The first metal frame is located at one end of the drum frame in the axial direction. The second metal frame is located at the other end of the drum frame in the axial direction. The first resin frame is located between the first metal frame and the second metal frame. The first resin frame is attached to an inner surface of the first metal frame. The developing cartridge includes a developing roller, a developing frame, and a separation shaft. The developing roller is rotatable about a developing shaft extending in the axial direction. The developing frame holds the developing roller. The separation shaft is held by the developing frame. The separation shaft is movable between a first position and a second position. When the separation shaft moves from the first position to the second position, the separation shaft moves the developing frame away from the photosensitive drum. When the separation shaft moves from the second position to the first position, the separation shaft moves the developing frame toward the photosensitive drum. The first resin frame includes a first guide and a first separation contact surface. The first guide positions the developing cartridge at an attachment position. The first separation contact surface is in contact with the separation shaft when the separation shaft is located at the second position.

Since the first resin frame includes the first guide and the first separation contact surface, the developing cartridge is accurately movable relative to the drum frame during the separation operation.

Figure 1:
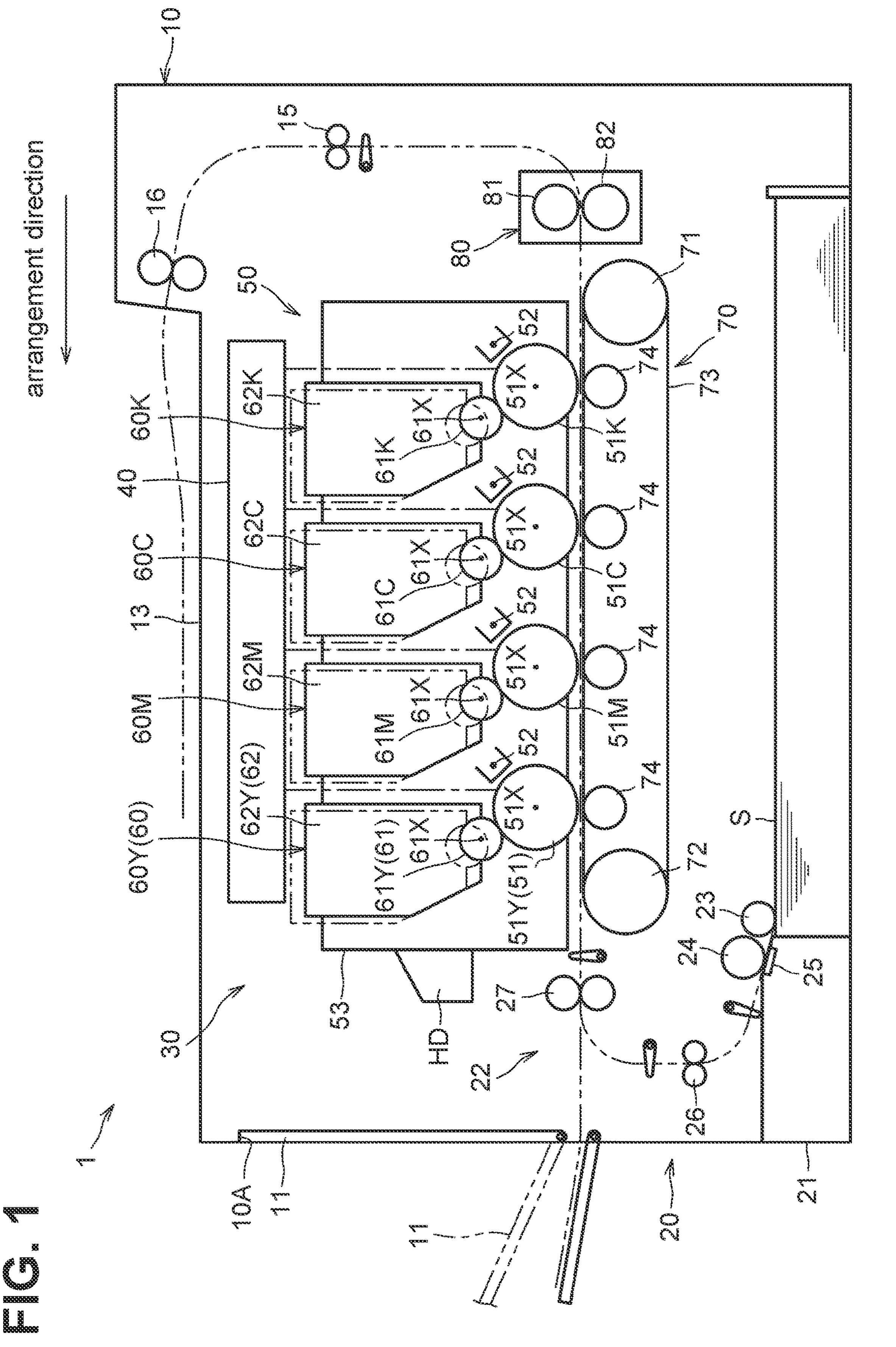
FIG. 1 illustrates a configuration of an image forming apparatus according to an embodiment.

Hereinafter, an embodiment of the present disclosure will be described. As illustrated in FIG. 1, the image forming apparatus 1 is a color printer. The image forming apparatus 1 includes a housing 10, a sheet supply unit 20, and an image forming unit 30.

The housing 10 includes a cover 11. The cover 11 is rotatable between an open position indicated by a two-dot-dash line and a closed position indicated by a solid line. The cover 11 opens an opening 10A at the open position. The cover 11 covers the opening 10A at the closed position.

The sheet supply unit 20 includes a sheet tray 21 and a supply mechanism 22. The sheet tray 21 is located below the image forming unit 30. The supply mechanism 22 includes a feed roller 23, a separation roller 24, a separation pad 25, a conveyance roller 26, and a registration roller 27.

The sheet tray 21 accommodates the sheets S therein. Examples of the sheet S include plain paper, an envelope, a postcard, thin paper, thick paper, glossy paper, a resin sheet, and a sticker. The sheets S are fed by the feed roller 23 and then may be separated one by one between the separation roller 24 and the separation pad 25. The sheet S is conveyed by the conveyance roller 26 toward the registration roller 27, the rotation of which is stopped, such that a skew of the sheet S may be adjusted. The registration roller 27 supplies the sheet S to the image forming unit 30 by its rotation.

The image forming unit 30 includes an exposure device 40, a drum cartridge 50, four developing cartridges 60, a conveyance device 70, and a fixing device 80.

The exposure device 40 includes a laser diode, a deflector, a lens, and a mirror. The exposure device 40 exposes surfaces of photosensitive drums 51. In FIG. 1, a light beam for exposing each photosensitive drum 51 is indicated by an alternate long and short dash line.

The drum cartridge 50 is attachable to and detachable from the housing 10. The drum cartridge 50 is attachable to and detachable from the housing 10 through the opening 10A. The drum cartridge 50 includes four photosensitive drums 51, four chargers 52, and a drum frame 53.

The photosensitive drums 51 are each rotatable about a drum axis 51X extending in an axial direction. The photosensitive drums 51 are arranged side by side. The photosensitive drums 51 are used to form images with different colors. In the present embodiment, each of the four photosensitive drums 51 correspond to one of different colors, e.g., yellow, magenta, cyan, and black.

In the following description, a direction in which the drum axis 51X of the photosensitive drum 51 extends is referred to as an "axial direction". Further, a direction in which the photosensitive drums 51 are arranged is referred to as an "arrangement direction". The axial direction and the arrangement direction intersect each other. The axial direction is orthogonal to the arrangement direction. An arrow indicating each direction in the drawings indicates "one side" in each direction. In addition, in the present specification and the drawings, similar elements, which correspond to different colors, each have a similar reference numeral with a letter Y for yellow, M for magenta, C for cyan, or K for black to be distinguished by color.

The charger 52 is disposed facing the photosensitive drum 51. The charger 52 charges the photosensitive drum 51.

The drum frame 53 holds the photosensitive drum 51 to be rotatable. The drum frame is configured to hold the developing cartridges 60.

Figure 2:
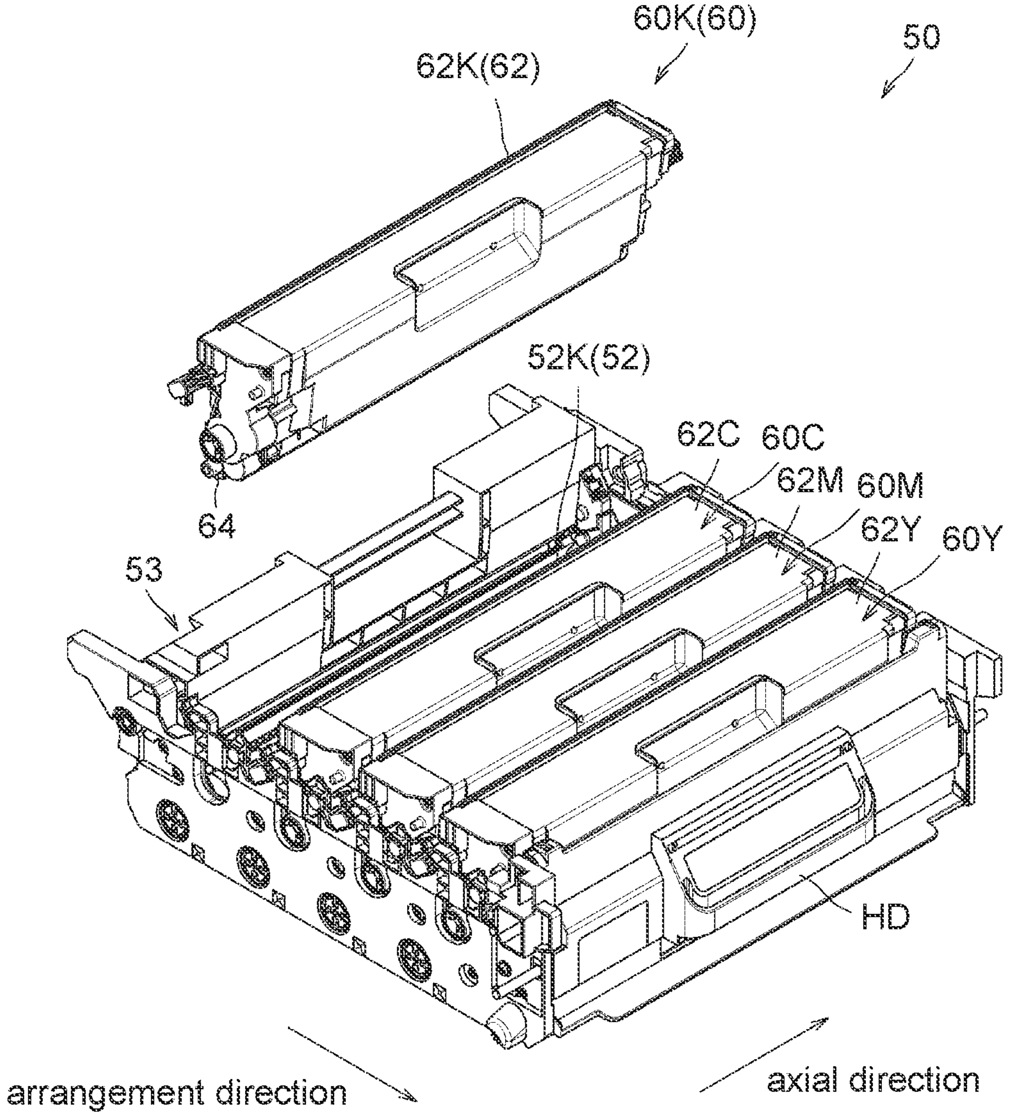
FIG. 2 is a perspective view of a drum cartridge to which a developing cartridge is attached.

As illustrated in FIGS. 1, 2 and 3, the developing cartridge 60 is attachable to the drum cartridge 50. The developing cartridge 60 includes a developing roller 61 and a developing frame 62. The developing roller 61 has a developing shaft 61A. The developing shaft 61A extends in the axial direction. The developing roller 61 is rotatable about a developing axle 61X extending in the axial direction. The developing roller 61 is configured to come into contact with the photosensitive drum 51. The developing frame 62 holds the developing roller 61 to be rotatable.

The developing cartridge 60 is movable between a contact position indicated by a solid line and a separation position indicated by a two-dot-dash line illustrated in FIG. 1. When the developing cartridge 60 is located at the contact position, the developing roller 61 is in contact with the photosensitive drum 51. When the developing cartridge 60 is located at the separation position, the developing roller 61 is away from the photosensitive drum 51.

The conveyance device 70 is positioned between the sheet tray 21 and the four photosensitive drums 51. The conveyance device 70 includes a drive roller 71, a driven roller 72, a conveyance belt 73, and four transfer rollers 74. The conveyor belt 73 is an endless belt. The conveyance belt 73 is stretched between the drive roller 71 and the driven roller 72. An outer surface of the conveyance belt 73 is in contact with the photosensitive drums 51. The transfer rollers 74 are positioned inside a track of the conveyance belt 73. The track of the conveyance belt 63 is between each transfer roller 74 and a corresponding photosensitive drum 51.

The fixing device 80 includes a heating roller 81 and a pressure roller 82. The pressure roller 82 faces the heating roller 81. A conveyance roller 15 and a discharge roller 16 are provided downstream of the fixing device 80 in a conveyance direction in which the sheet S is conveyed.

In the image forming unit 30, the surface of the photosensitive drum 51 is uniformly charged by the charger 52, and then exposed to the light beam emitted from the exposure device 40. As a result, an electrostatic latent image based on image data is formed on the photosensitive drum 51. The toner contained in the developing cartridge 60 is carried onto the surface of the developing roller 61. The toner on the developing roller 61 is supplied to the electrostatic latent image formed on the photosensitive drum 51. Thus, a toner image is formed on the photosensitive drum 51.

When the sheet S is conveyed on the conveyance belt 73 and passes between the photosensitive drum 51 and the transfer roller 74, the toner image is transferred from the photosensitive drum 51 to the sheet S. When the sheet S passes between the heating roller 81 and the pressure roller 82, the toner image is thermally fixed to the sheet S. Thereafter, the conveyance roller 15 and the discharge roller 16 discharge the sheet S onto a discharge tray 13.

Figure 3A:
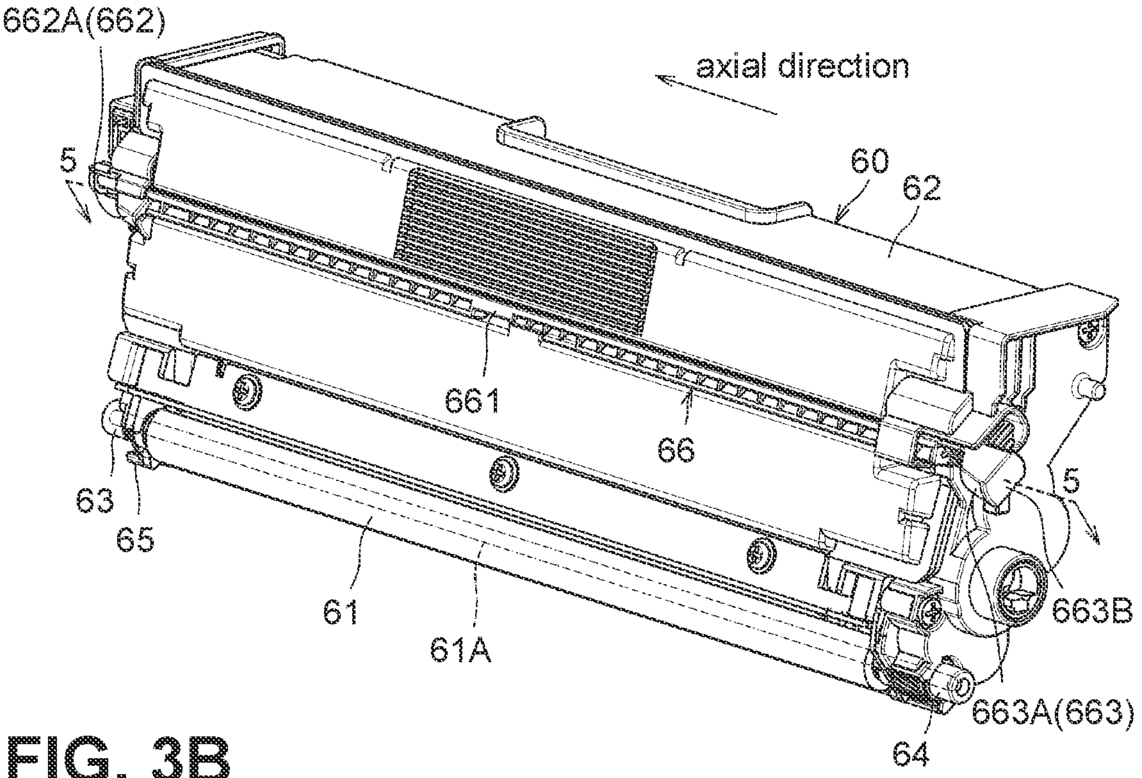
FIGS. 3A and 3B are perspective views of a developing cartridge.
Figure 3B:
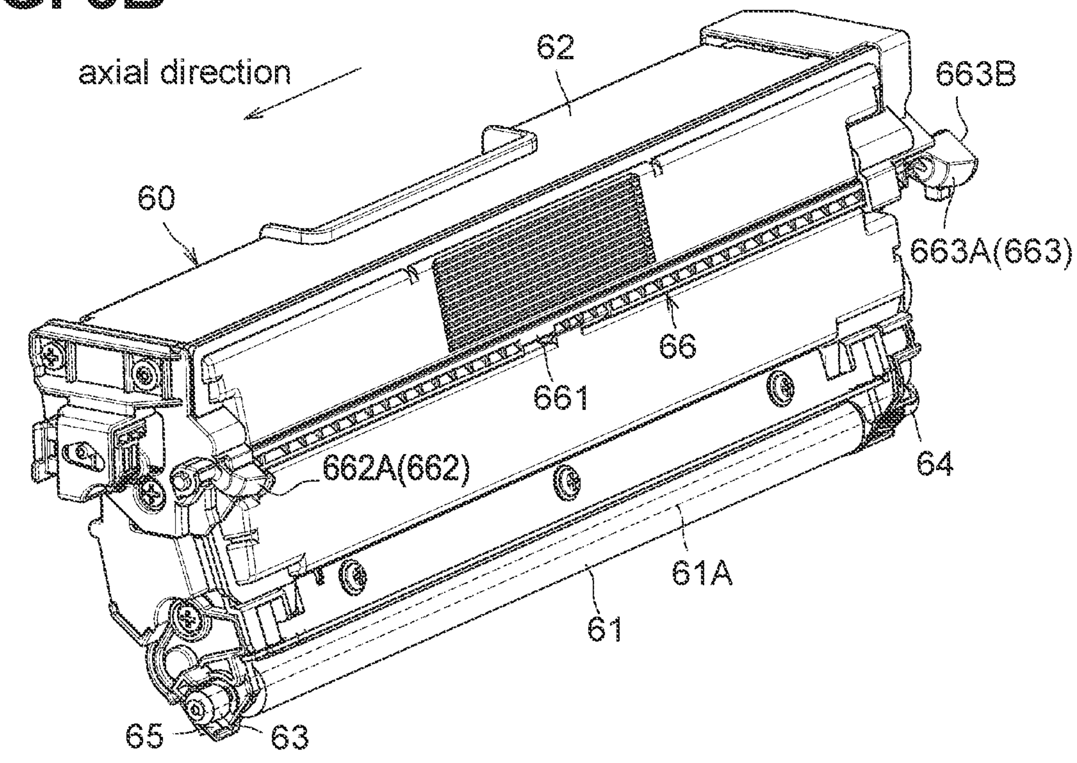

As illustrated in FIGS. 3A and 3B, the developing cartridge 60 further includes a first collar 63, a second collar 64, a developing electrode 65, and a separation shaft 66.

The first collar 63 covers an end portion of the developing shaft 61A on one side in the axial direction. The first collar 63 has a cylindrical shape. As the developing cartridge 60 is attached to the drum cartridge 50, the first collar 63 is used for guiding the developing cartridge 60 to an attachment position.

The second collar 64 covers an end portion of the developing shaft 61A on the other side in the axial direction. The second collar 64 has a cylindrical shape. As the developing cartridge 60 is attached to the drum cartridge 50, the second collar 64 is used for guiding the developing cartridge 60 to the attachment position.

The developing electrode 65 is disposed at an end portion of the developing cartridge 60 on one side in the axial direction. The developing electrode 65 is an electrode for transferring a bias to the developing roller 61.

The separation shaft 66 is configured to move the developing cartridge 60 from the contact position to the separation position. The separation shaft 66 is held by the developing frame 62. The separation shaft 66 includes a shaft 661, a first cam 662 and a second cam 663. As illustrated in FIGS. 3A and 3B, the shaft 661 is fitted into a groove formed in the outer surface of the developing frame 62. As a result, the separation shaft 66 is held slidably in the axial direction with respect to the developing frame 62.

The shaft 661 extends in the axial direction. The shaft 661 extends from an end portion of the developing frame 62 on one side to an end portion thereof on the other side.

Figure 4:
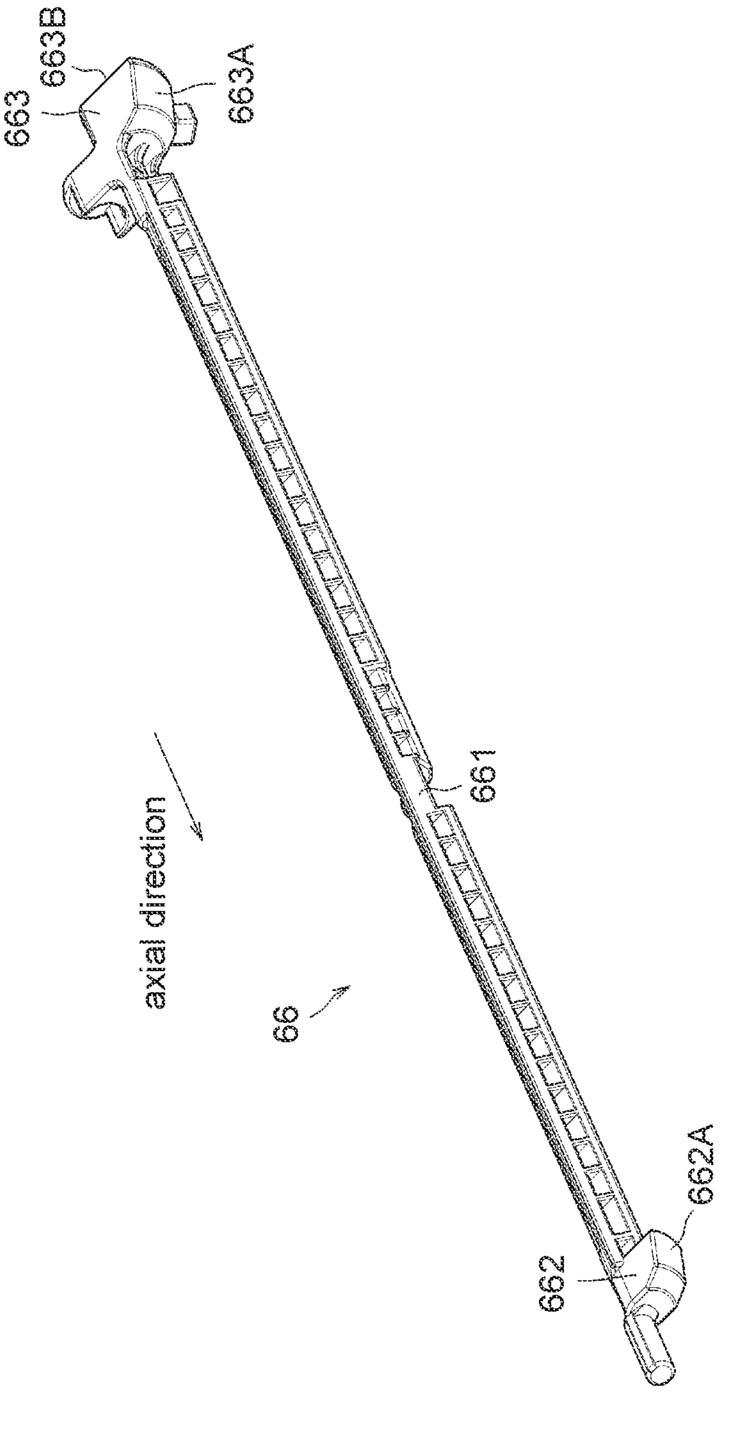
FIG. 4 is a perspective view of a separation shaft.

As illustrated in FIG. 4, the first cam 662 is located at an end portion of the shaft 661 on one side in the axial direction. The first cam 662 is located outside the developing frame 62. The first cam 662 has a first inclined surface 662A. The first inclined surface 662A is inclined with respect to the axial direction. The first inclined surface 662A is inclined such that a distance from the shaft 661 to the first inclined surface 662A orthogonal to the axial direction gradually increases from one side toward the other side in the axial direction.

The second cam 663 is located at an end portion of the shaft 661 on the other side in the axial direction. The second cam 663 is located outside the developing frame 62. The second cam 663 has a second inclined surface 663A and a pressed surface 663B. The second inclined surface 663A is inclined with respect to the axial direction. The second inclined surface 663A is inclined such that a distance from the shaft 661 to the second inclined surface 663A orthogonal to the axial direction gradually increases from one side toward the other side in the axial direction. The pressed surface 663B is to be pressed by a pressing protrusion provided in the housing 10.

Figure 5A:
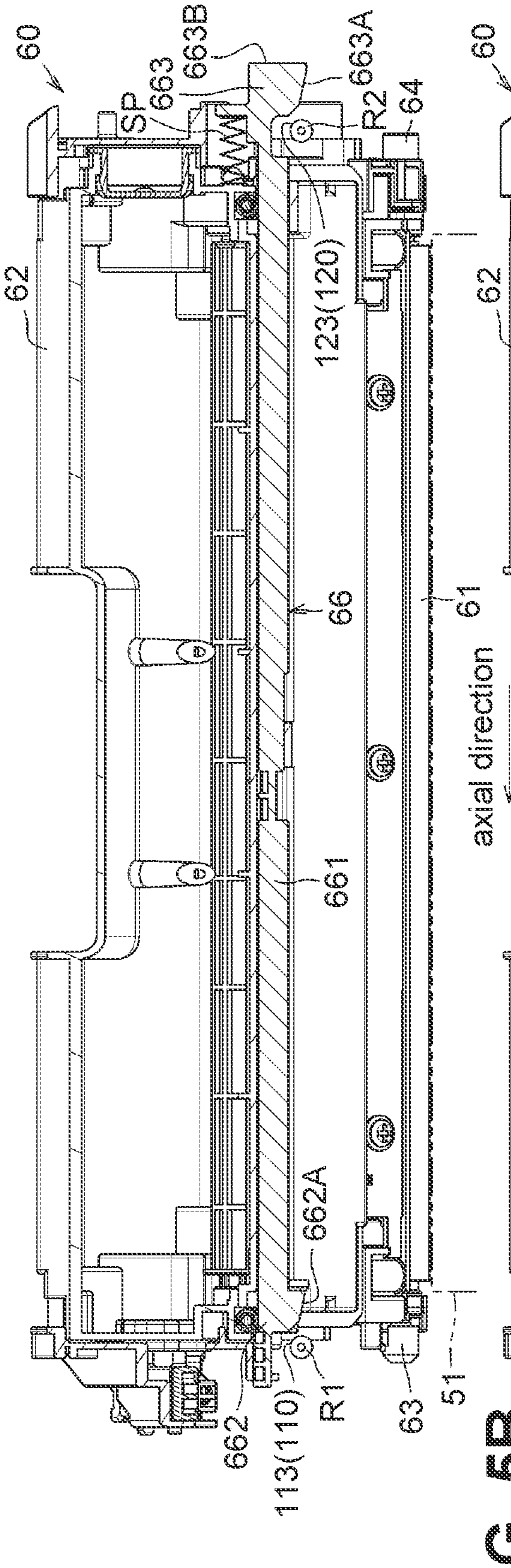
FIG. 5A is a cross-sectional view of the developing cartridge taken along 5-5 line in FIG. 3A, illustrating the separation shaft located at a first position.
Figure 5B:
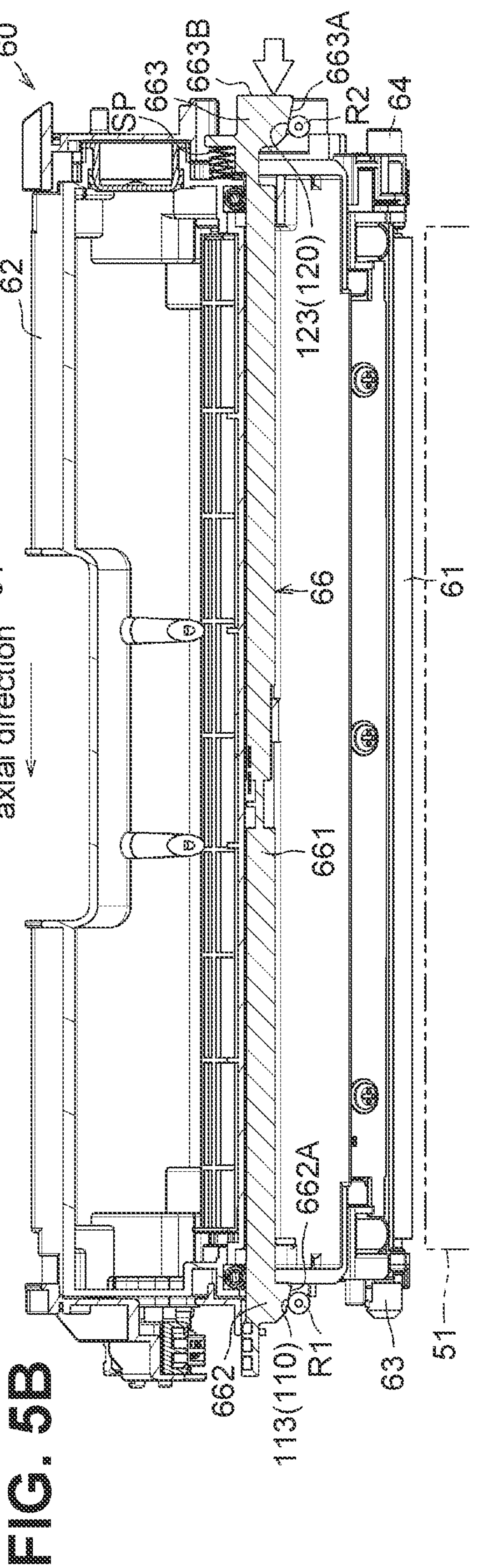
FIG. 5B is a cross-sectional view of the developing cartridge taken along 5-5 line in FIG. 3B illustrating the separation shaft located at a second position.

As illustrated in FIGS. 5A and 5B, the separation shaft 66 is movable in the axial direction between a first position illustrated in FIG. 5A and a second position illustrated in FIG. 5B. A compression spring SP is disposed between the separation shaft 66 and the developing frame 62. The compression spring SP presses the separation shaft 66 toward the first position. Thus, when the pressed surface 663B of the separation shaft 66 is not pressed by the pressing protrusion, the separation shaft 66 is located at the first position. In contrast, as the pressed surface 663B is pressed by the pressing protrusion, the separation shaft 66 moves from the first position to the second position.

Figure 6:
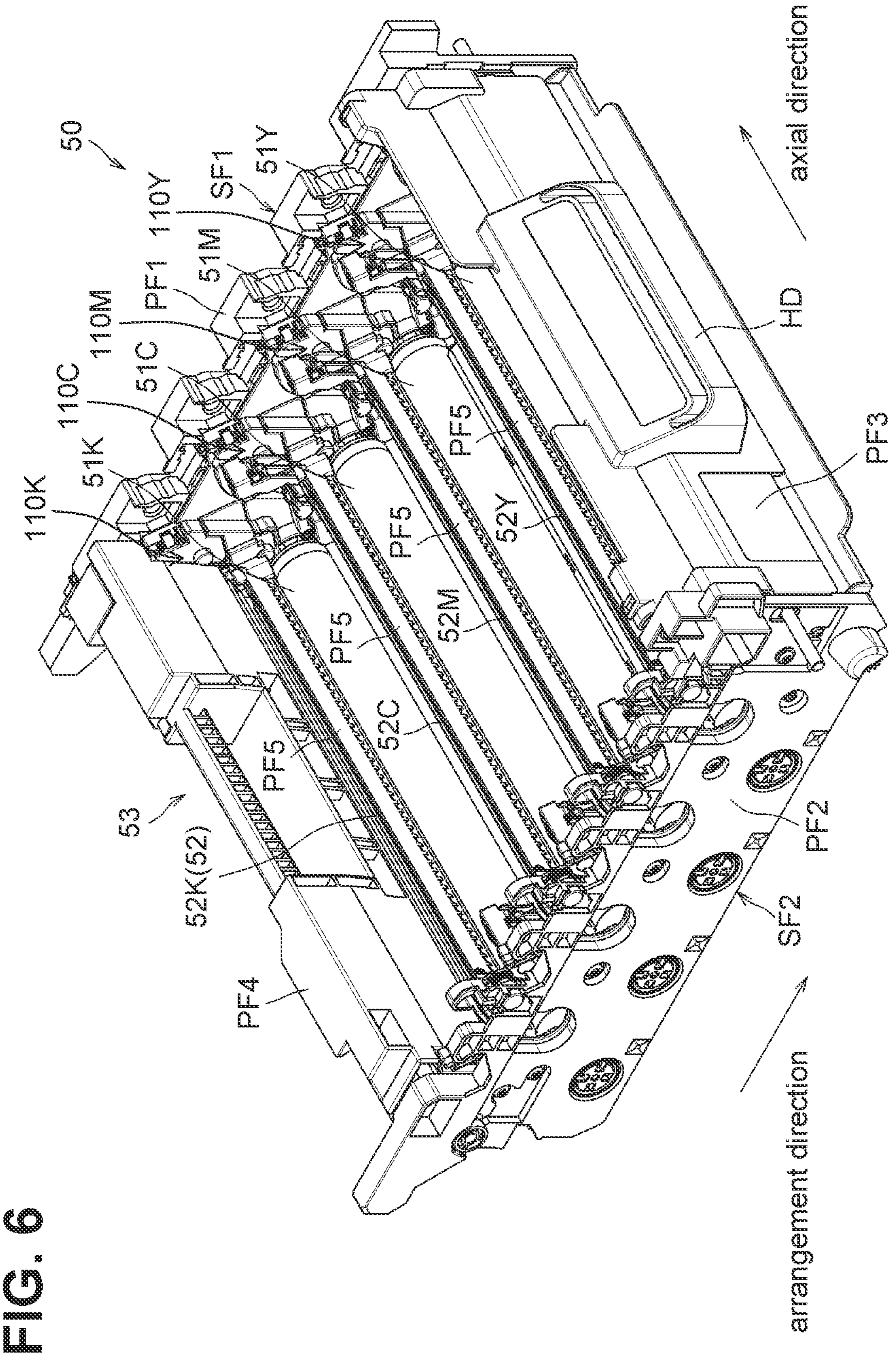
FIG. 6 is a perspective view of the drum cartridge.

As illustrated in FIG. 6, the drum frame 53 includes a first side frame SF1, a second side frame SF2, a first connecting frame PF3, a second connecting frame PF4, and four charger frames PF5.

Figure 7:
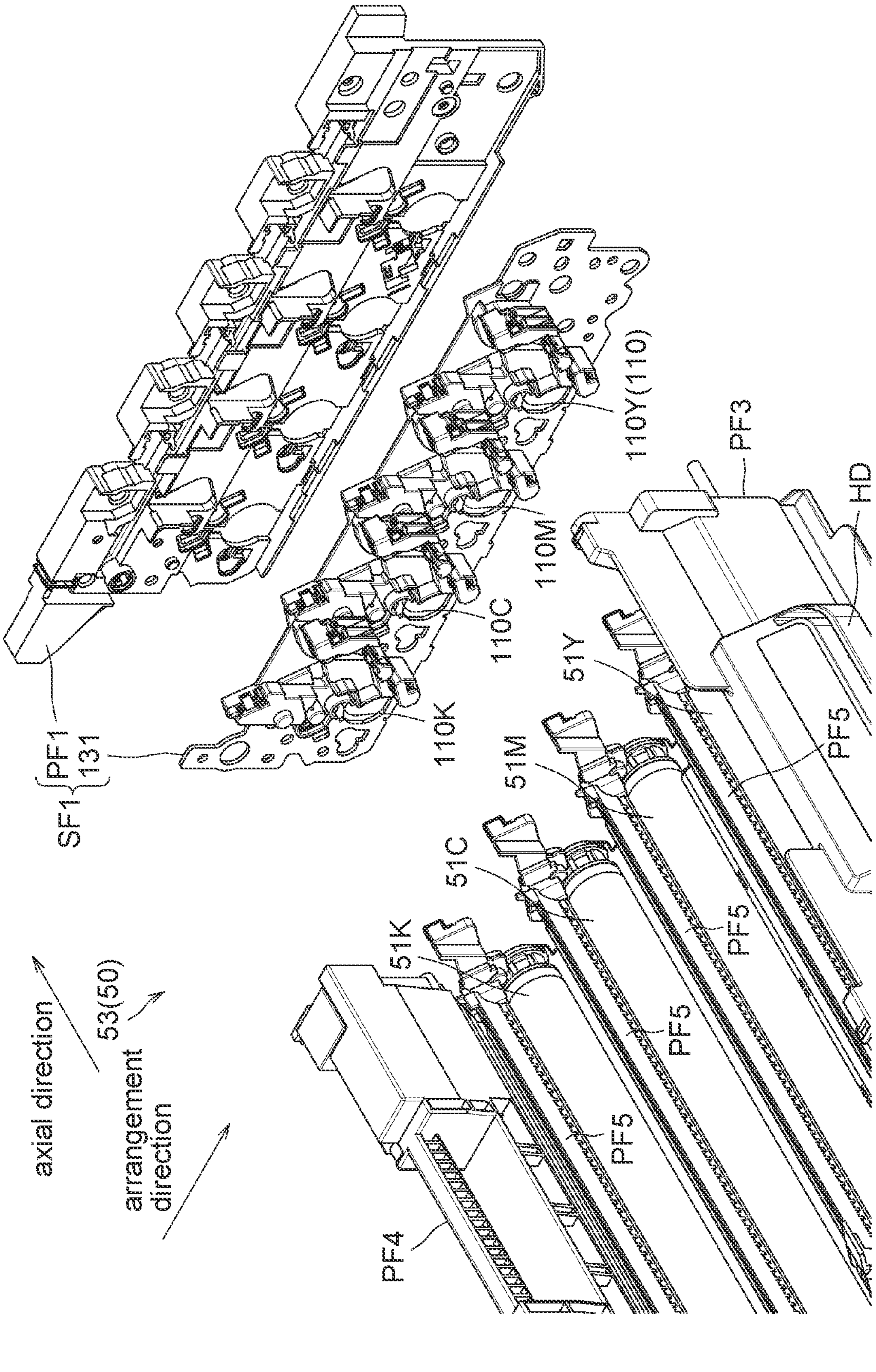
FIG. 7 is an exploded perspective view of the drum cartridge on one side in an axial direction.

As illustrated in FIG. 7, the first side frame SF1 includes a first metal frame 131 and a first outer frame PF1. The first metal frame 131 is located at an end portion of the drum frame 53 on one side in the axial direction and extends in the arrangement direction. The first metal frame 131 has a plate shape and is made of metal. When the four developing cartridges 60 are attached to the drum frame 53, the four developing cartridges 60 are arranged along the first metal frame 131.

The first outer frame PF1 is located exterior to the first metal frame 131 in the axial direction and extends in the arrangement direction. The first outer frame PF1 has a plate shape and is made of resin. The first outer frame PF1 is fixed to the first metal frame 131 with screws N.

Figure 13:
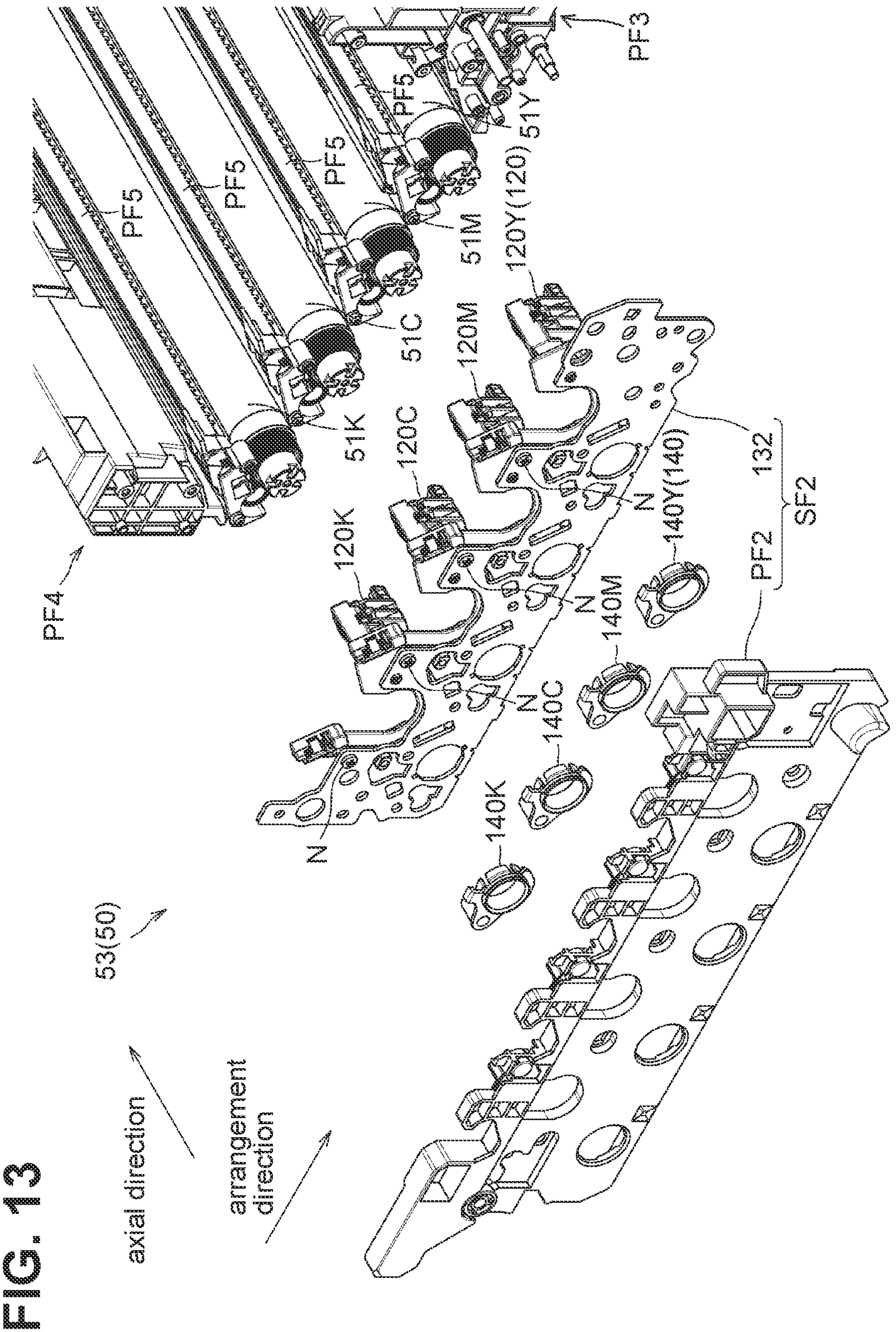
FIG. 13 is an exploded perspective view of the drum cartridge on the other side in the axial direction.

As illustrated in FIG. 13, the second side frame SF2 includes a second metal frame 132 and a second outer frame PF2. The second metal frame 132 is located at an end portion of the drum frame 53 on the other side in the axial direction and extends in the arrangement direction. The second metal frame 132 has a plate shape and is made of metal. When the four developing cartridges 60 are attached to the drum frame 53, the developing cartridges 60 are arranged along the second metal frame 132.

The second outer frame PF2 is located exterior to the second metal frame 132 in the axial direction and extends in the arrangement direction. The second outer frame PF2 has a plate shape and is made of resin. The second outer frame PF2 is fixed to the second metal frame 132 with screws N.

Four bearings 140 are disposed between the second metal frame 132 and the second outer frame side PF2. The bearings 140 are fixed to the second metal frame 132. Each of the bearings 140 holds an end portion of a corresponding one of the photosensitive drums 51 on the other side in the axial direction.

As illustrated in FIG. 6, the first connecting frame PF3 is disposed at an end portion of the drum frame 53 on one side in the arrangement direction and extends in the axial direction. The first connecting frame PF3 has a plate shape and is made of resin.

The first connecting frame PF3 is fixed to an end portion of the first side frames SF1 on one side in the arrangement direction with a screw. The first connecting frame PF3 is further fixed to an end portion of the second side frame SF2 on one side in the arrangement direction with a screw. Thus, the first connecting frame PF3 connects the end portion of the first side frame SF1 on one side in the arrangement direction with the end portion of the second side frame SF2 on one side in the arrangement direction.

The first connecting frame PF3 has a handle HD. The handle HD may be gripped by a user when the drum cartridge 50 is attached or detached.

The second connecting frame PF4 is disposed at an end portion of the drum frame 53 on the other side in the arrangement direction and extends in the axial direction. The second connecting frame PF4 has a plate shape and is made of resin.

The second connecting frame PF4 is fixed to an end portion of the first side frames SF1 on the other side in the arrangement direction with screws. The second connecting frame PF4 is further fixed to an end portion of the second side frame SF2 on the other side in the arrangement direction by a screw. Thus, the second connecting frame PF4 connects the end portion of the first side frame SF1 on the other side in the arrangement direction with the end portion of the second side frame SF2 on the other side in the arrangement direction.

Each of the four charger frames PF5 holds a charger 52. The charger frames PF5 are held by the first side frame SF1 and the second side frame SF2. The charger frames PF5 are aligned in the arrangement direction such that each charger 52 faces a corresponding photosensitive drum 51.

As illustrated in FIGS. 7 and 13, the drum frame 53 further includes four first resin frames 110 and four second resin frames 120.

The first resin frames 110 are positioned between the first metal frame 131 and the second metal frame 132. More specifically, the first resin frames 110 are each positioned between the first metal frame 131 and a corresponding photosensitive drum 51 in the axial direction.

Figure 8:
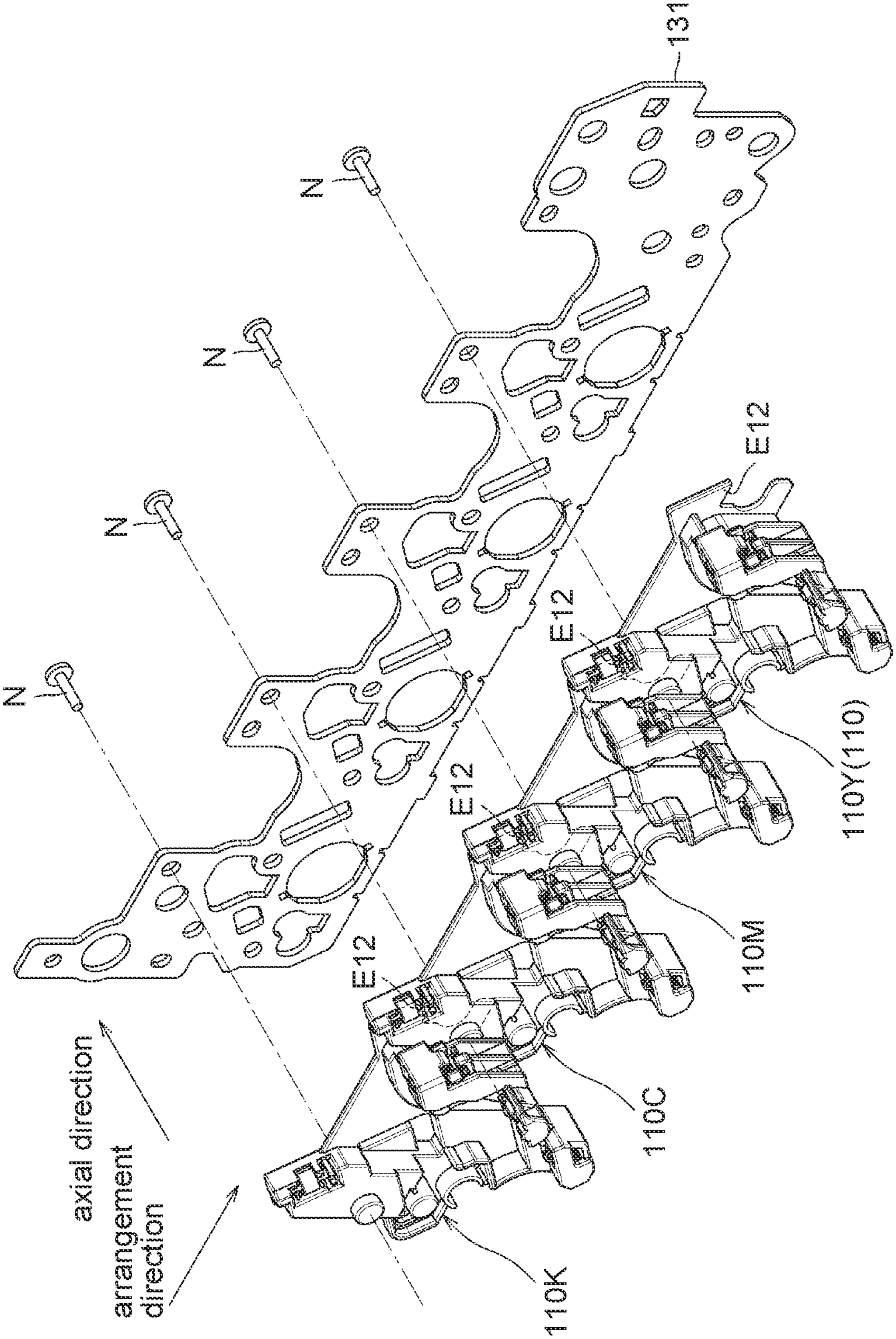
FIG. 8 is a perspective view of a first metal frame and a first resin frame.

As illustrated in FIG. 8, the first resin frames 110 are attached to an inner surface of the first metal frame 131 with screws N. The first resin frame 110 is made of resin. The first resin frames 110 are arranged in the arrangement direction such that each first resin frame 110 corresponds to a different developing cartridge 60. That is, adjacent to one first resin frame 110, another first resin frame 110 is disposed. In this manner, the one first resin frame 110 and the another first resin frame 110 are arranged side by side along the first metal frame 131.

Since the four first resin frames 110 have the same shape, the first resin frame 110M corresponding to the magenta toner is representatively described with reference to FIG. 9 to FIG. 12.

Figure 9A:
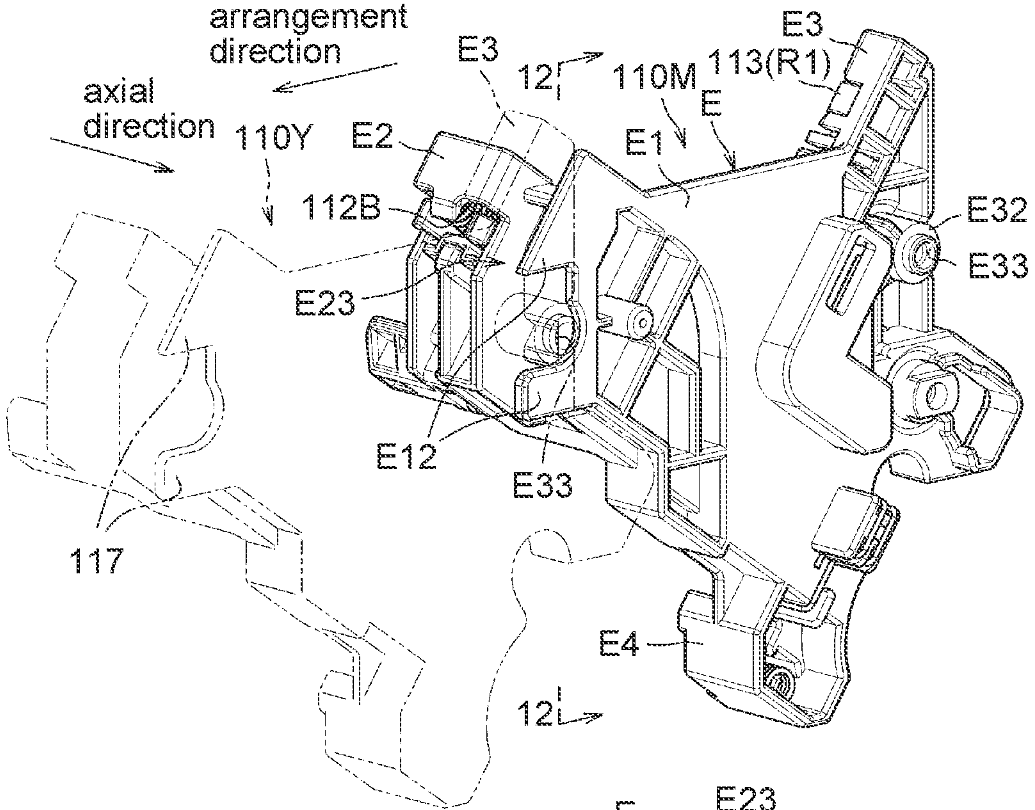
FIGS. 9A and 9B are perspective views of the first resin frame.
Figure 9B:
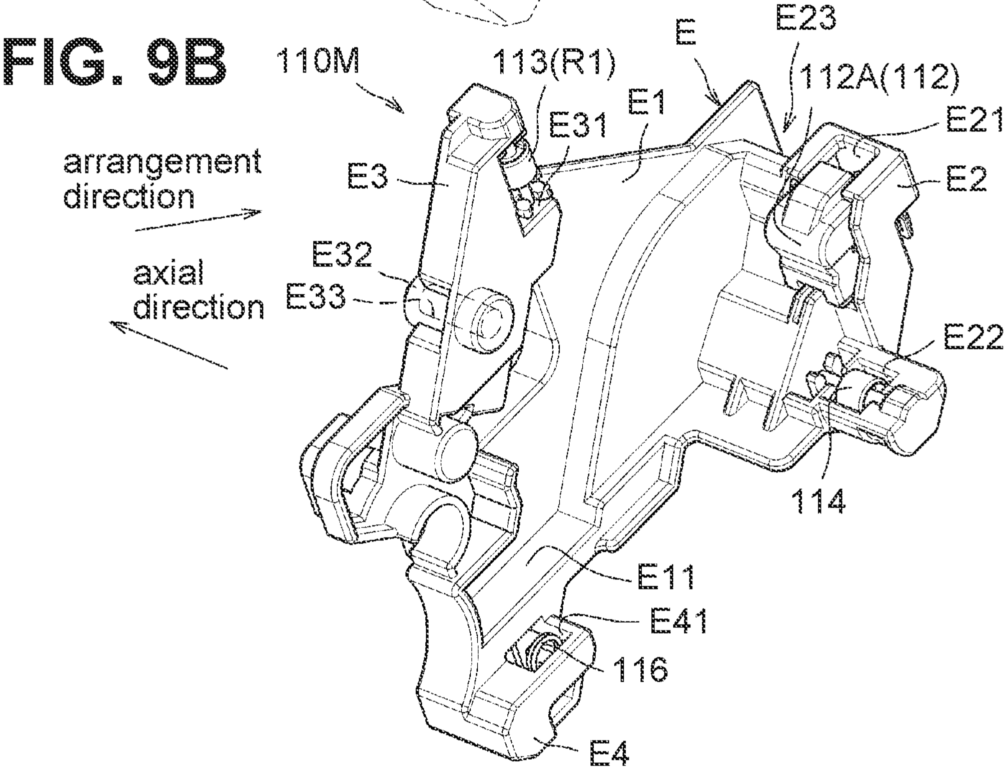

As illustrated in FIGS. 9A and 9B, the first resin frame 110M includes a frame body E, a developing pressing portion 112, a roller R1, a support roller 114, and an electrical contact 116. The frame body E includes a plate-shaped portion E1, a first extending portion E2, a second extending portion E3, and a third extending portion E4.

The plate-shaped portion E1 has a flat-plate shape along the first metal frame 131. The plate-shaped portion E1 includes a first guide E11 and an overlap portion E12.

Figure 10:
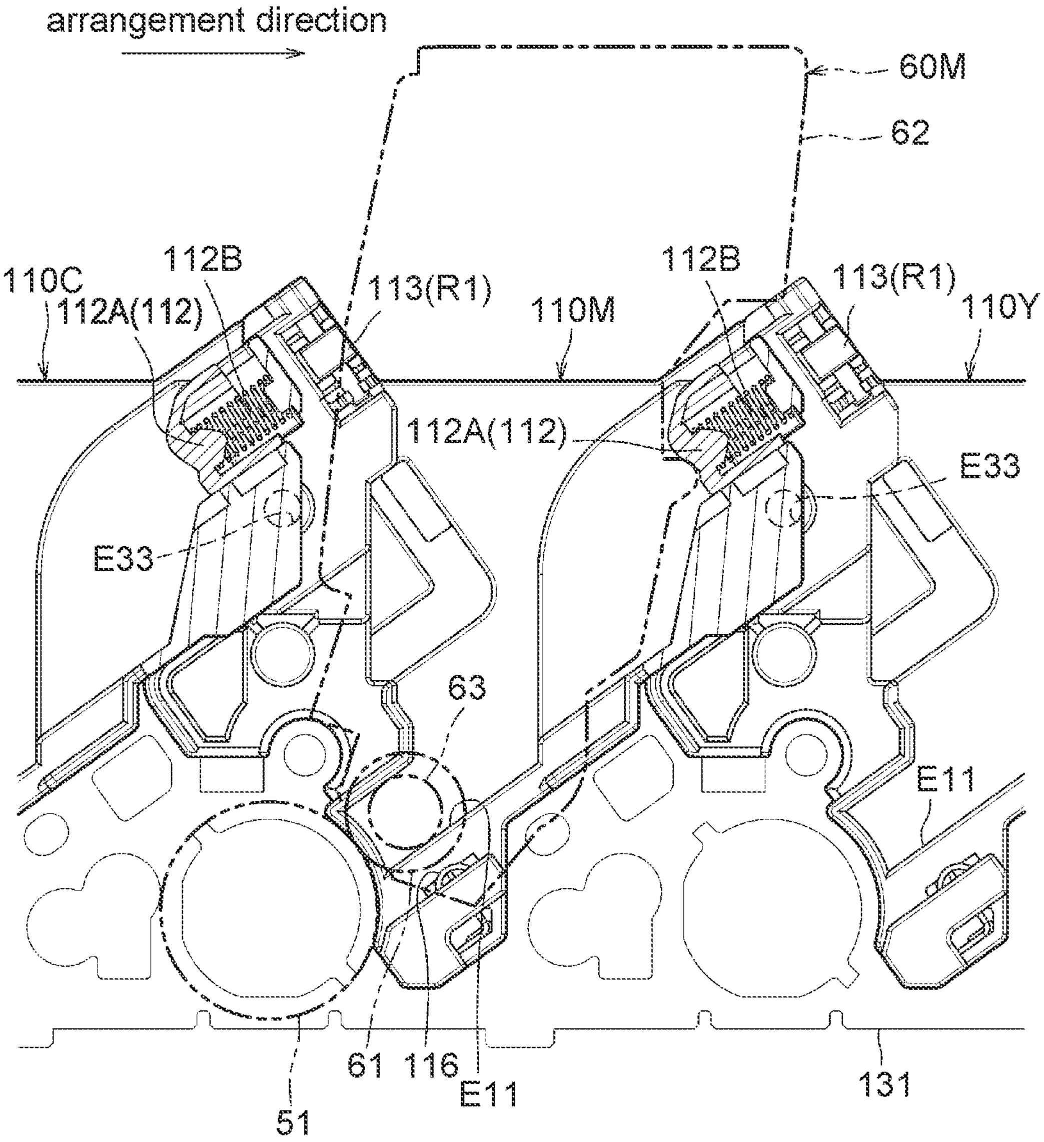
FIG. 10 illustrates the first resin frame viewed from the inside of the drum cartridge when the developing cartridge is located at a contact position.
Figure 11:
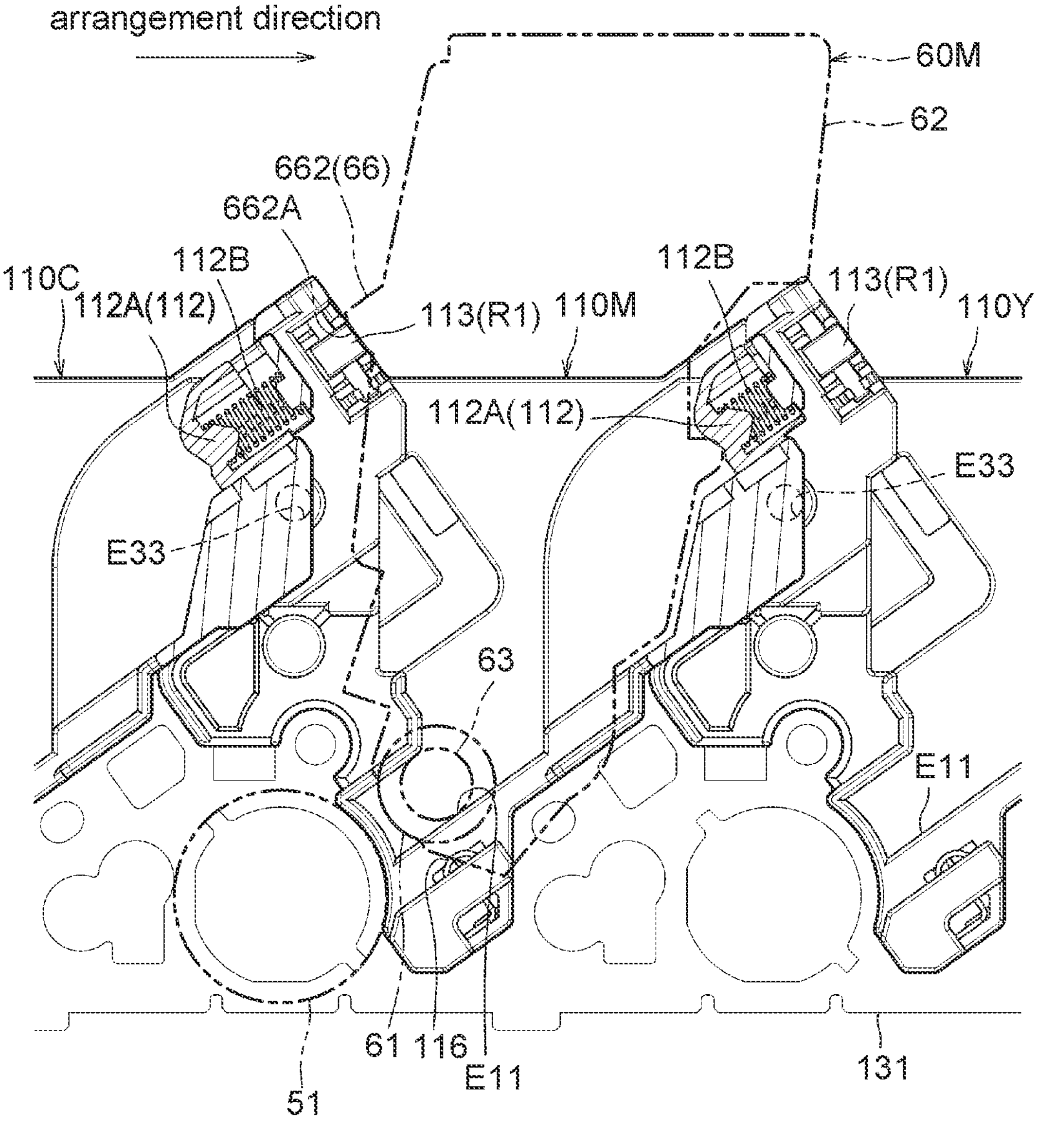
FIG. 11 illustrates the first resin frame viewed from the inside of the drum cartridge when the developing cartridge is located at a separation position.

The first guide E11 is a groove formed on an inner surface of the plate-shaped portion E1. The first guide E11 is located at a lower portion of the plate-shaped portion E1. As illustrated in FIG. 10, the first guide E11 extends obliquely with respect to the arrangement direction. The first guide E11 positions the developing cartridge 60M at the attachment position when the developing cartridge 60M is attached to the drum frame 53. To be specific, as the developing cartridge 60M is attached to the drum frame 53, the first collar 63 of the developing cartridge 60M enters the first guide E11. When the first collar 63 enters the first guide E11, the developing cartridge 60M is positioned at the attachment position. As illustrated in FIGS. 10 and 11, the first guide E11 guides the first collar 63 as the developing cartridge 60M, which is attached to the drum frame 53, moves between the contact position and the separation position.

As illustrated in FIGS. 9A and 9B, the overlap portion E12 is located at an end portion of the plate-shaped portions E1 on one side in the arrangement direction. The overlap portion E12 includes two protrusions extending in the arrangement direction. When the four first resin frames 110 are assembled to the first metal frame 131, the overlap portion E12 of the first resin frame 110M overlaps the first resin frame 110Y A groove E23 extending in the up-down direction is provided between the overlap portion E12 and the first extending portion E2.

The first extending portion E2 extends from one end portion of the plate-shaped portions E1 in the arrangement direction toward the other side in the axial direction. A developing pressing portion 112 is disposed to the first extending portion E2.

Specifically, the first extending portion E2 has a recess E21 opened toward the other side in the arrangement direction at an upper portion thereof. The developing pressing portion 112 includes a pressing member 112A and a spring 112B. At least a portion of the pressing member 112A is located in the recess E21. The pressing member 112A is slidably held by the recess E21. The pressing member 112A is slidable along the first guide E11. The spring 112B is located in the recess E21. The spring 112B is located between the pressing member 112A and the bottom of the recess E21. The spring 112B is a compression spring.

The pressing member 112A comes into contact with the developing frame 62 as the developing cartridge 60M is attached to the drum frame 53. Specifically, when the developing cartridge 60M is attached to the drum frame 53, the developing pressing portion 112 presses the developing frame 62 with the urging force of the spring 112B. When the developing pressing portion 112 presses the developing frame 62, the developing roller 61 is pressed toward the photosensitive drum 51.

In addition, the first extending portion E2 has a recess E22 at a lower portion thereof. Apart of the support roller 114 is located in the recess E22 and is rotatably held. The support roller 114 is rotatable about a rotation axis extending in the axial direction. The support roller 114 supports the developing frame 62 when the developing cartridge 60M is attached to the drum frame 53. In other words, when the developing cartridge 60M is attached to the drum frame 53, the support roller 114 receives the weight of the developing frame 62. The support roller 114 is rotatable while being in contact with the developing frame 62 as the developing cartridge 60M is attached and detached.

The second extending portion E3 extends from the other end portion of the plate-shaped portions E1 in the arrangement direction toward the other side in the axial direction. The second extending portion E3 includes a recess E31, a boss E32, and a fixing hole E33.

A roller R1 is disposed in the recess E31. A portion of the roller R1 is located in the recess E31. The roller R1 is rotatably held by the first resin frame 110M. The roller R1 is rotatable about a rotation axis extending in a direction orthogonal to both the axial direction and a separation direction in which the developing roller 61 moves from the photosensitive drum 51.

An outer peripheral surface of the roller R1 is a first separation contact surface 113 that comes into contact with the separation shaft 66 of the developing cartridge 60M as the developing cartridge 60M moves from the contact position to the separation position. That is, the first separation contact surface 113 is in contact with the separation shaft 66 when the separation shaft 66 is located at the second position.

The boss E32 extends from the second extending portion E3 toward one side in the axial direction. The boss E32 has a fixing hole E33 opened to one side in the axial direction. The fixing hole E33 extends in the axial direction. In the fixing hole E33, a screw N for fixing the first resin frame 110M to the first metal frame 131 is inserted. The fixing hole E33 is located at an end portion of the first resin frame 110M on the other side in the arrangement direction.

The third extending portion E4 extends from the lower portion of the plate-shaped portion E1 toward the other side in the axial direction. The third extending portion E4 has a recess E41. The electrical contact 116 is disposed on the recess E41. The electrical contact 116 is a metal wire. The electrical contact 116 has one end exposed to the inside of the first resin frame 110M from the recess E41, and the other end exposed to the outside of the first side-frame side SF1 in the axial direction.

The electrical contact 116 is in contact with the developing electrode 65 when the developing cartridge 60M is attached to the drum frame 53. The developing electrode 65 is configured to transfer a bias to the developing roller 61 while the developing electrode 65 is in contact with the electrical contact 116.

When the first resin frame 110M indicated by the solid line and the first resin frame 110Y indicated by the two-dot-dash line in FIG. 9A are assembled to the first metal frame 131, the second extending portion E3 of the first resin frame 110Y indicated by the two-dot-dash line is located in the groove E23 of the first resin frame 110M.

Figure 12:
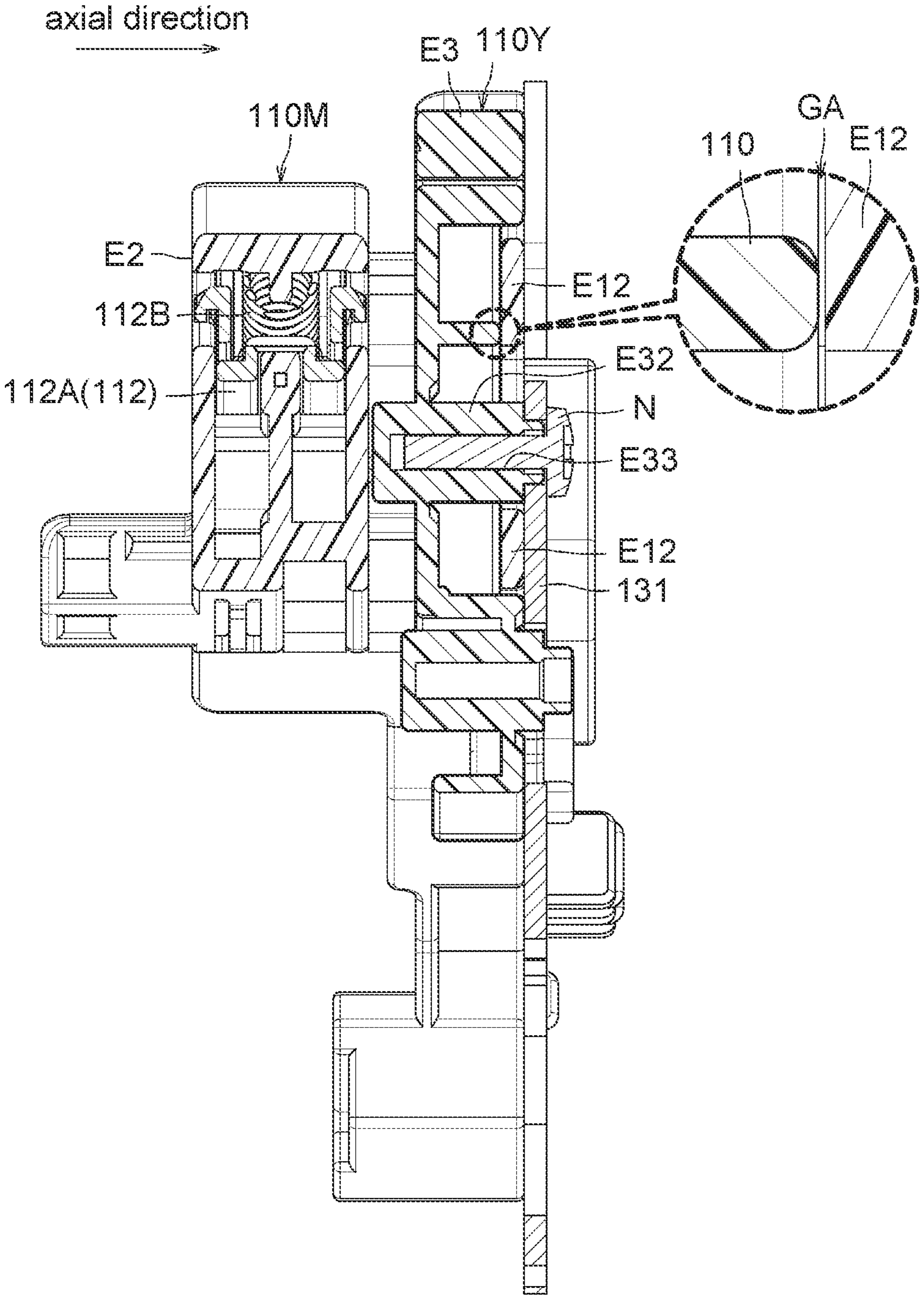
FIG. 12 is a cross-sectional view taken along 12-12 line in FIG. 9A.

As illustrated in FIG. 12, the screw N is inserted into the fixing hole E33 of the first resin frame 110Y from one side in the axial direction, and fixes the first resin frame 110Y to the first metal frame 131. A portion of the another first resin frame 110Y is located between one end portion of the first resin frame 110M and the first metal frame 131. To be specific, an overlap portion E12 of the first resin frame 110M is located between the first resin frame 110Y and the first metal frame 131. In this way, the first resin frame 110M and the first resin frame 110Y overlap each other in the axial direction.

As illustrated in FIG. 8, the overlap portion E12 of the first resin frame 110K is located between the first resin frame 110C and the first metal frame 131. In addition, the overlap portion E12 of the first resin frame 110C is located between the first resin frame 110M and the first metal frame 131. The overlap portion E12 of the first resin frame 110Y is located between the first connecting frame PF3 and the first metal frame 131.

Each first resin frame 110 is fixed to the first metal frame 131 at its other end portion in the arrangement direction with only one screw N, and is unfixed to the first metal frame 131 at its one end portion in the arrangement direction. However, since the overlap portion E12 of, for example, the first resin frame 110M, is located between its adjacent first resin frame 110Y and the first metal frame 131, the overlap portion E12 is supported by the adjacent first resin frame 110Y if the one end portion of the first resin frame 110M is deformed so as to separate from the first metal frame 131. Therefore, the first resin frame 110 is fixed to the first metal frame 131 with sufficient strength with only one screw N.

As illustrated in FIG. 12, there is a gap GA in the axial direction between the first resin frame 110M and a portion of the first resin frame 110Y. Thus, the overlap portion E12 of the first resin frame 110M is not held by the first resin frame 110Y and the first metal frame 131. That is, the fastening force of the screw N may not be applied to the overlap portion E12 of the first resin frame 110M.

The second resin frames 120 are positioned between the first metal frame 131 and the second metal frame 132. Specifically, as shown in FIG. 13, the second resin frames 120 are each positioned between the second metal frame 132 and a corresponding photosensitive drum 51 in the axial direction. The second resin frames 120 are attached to the inner surface of the second metal frame 132 with screws N. The second resin frames 120 are made of resin.

As illustrated in FIG. 13, the second resin frames 120 are arranged in the arrangement direction such that each second resin frame 120 corresponds to a different developing cartridge 60. That is, adjacent to one second resin frame 120, another second resin frame 120 is disposed. In this manner, the one second resin frame 120 and the another second resin frame 120 are arranged side by side along the second metal frame 132.

Since the four second resin frames 120 have the same shape, the second resin frame 120M corresponding to the magenta toner is representatively described with reference to FIG. 13 to FIG. 18.

Figure 15A:
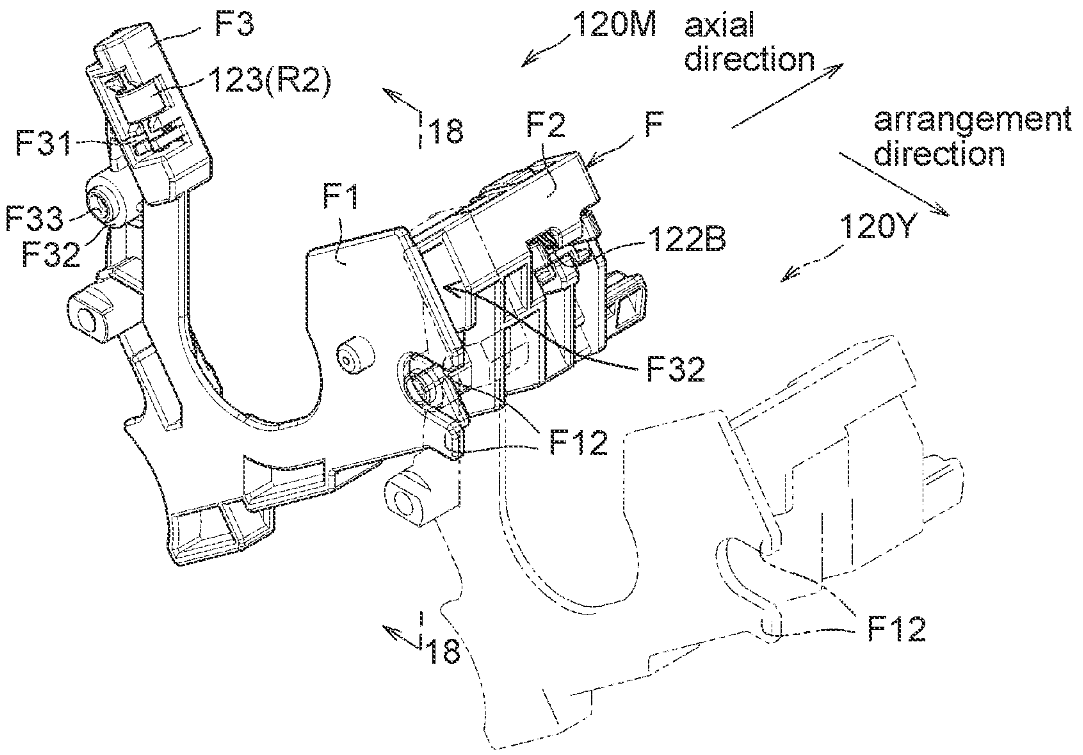
FIGS. 15A and 15B are perspective views of the second resin frame.
Figure 15B:
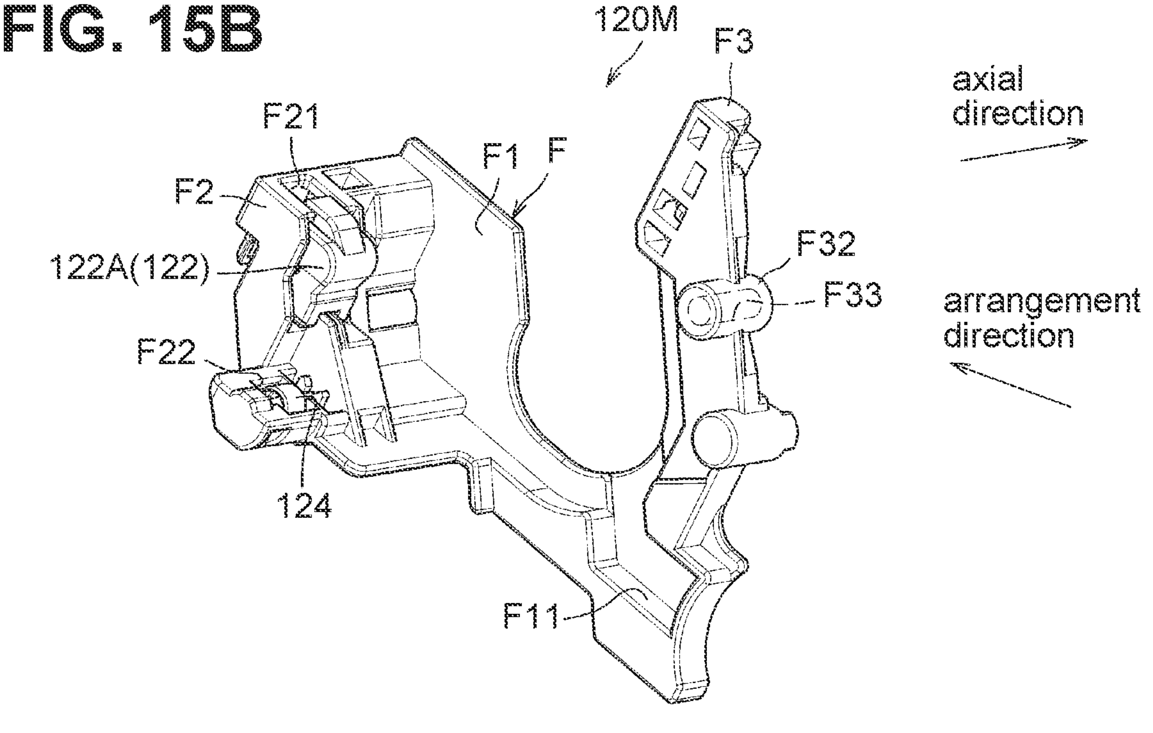

As illustrated in FIGS. 15A and 15B, the second resin frame 120M includes a frame main body F, a developing pressing portion 122, a roller R2, and a support roller 124. The frame body F includes a plate-shaped portion F1, a first extending portion F2, and a second extending portion F3.

The plate-shaped portion F1 has a flat-plate shape along the second metal frame 132. The plate-shaped portion F1 includes a second guide F11 and an overlap portion F12.

Figure 16:
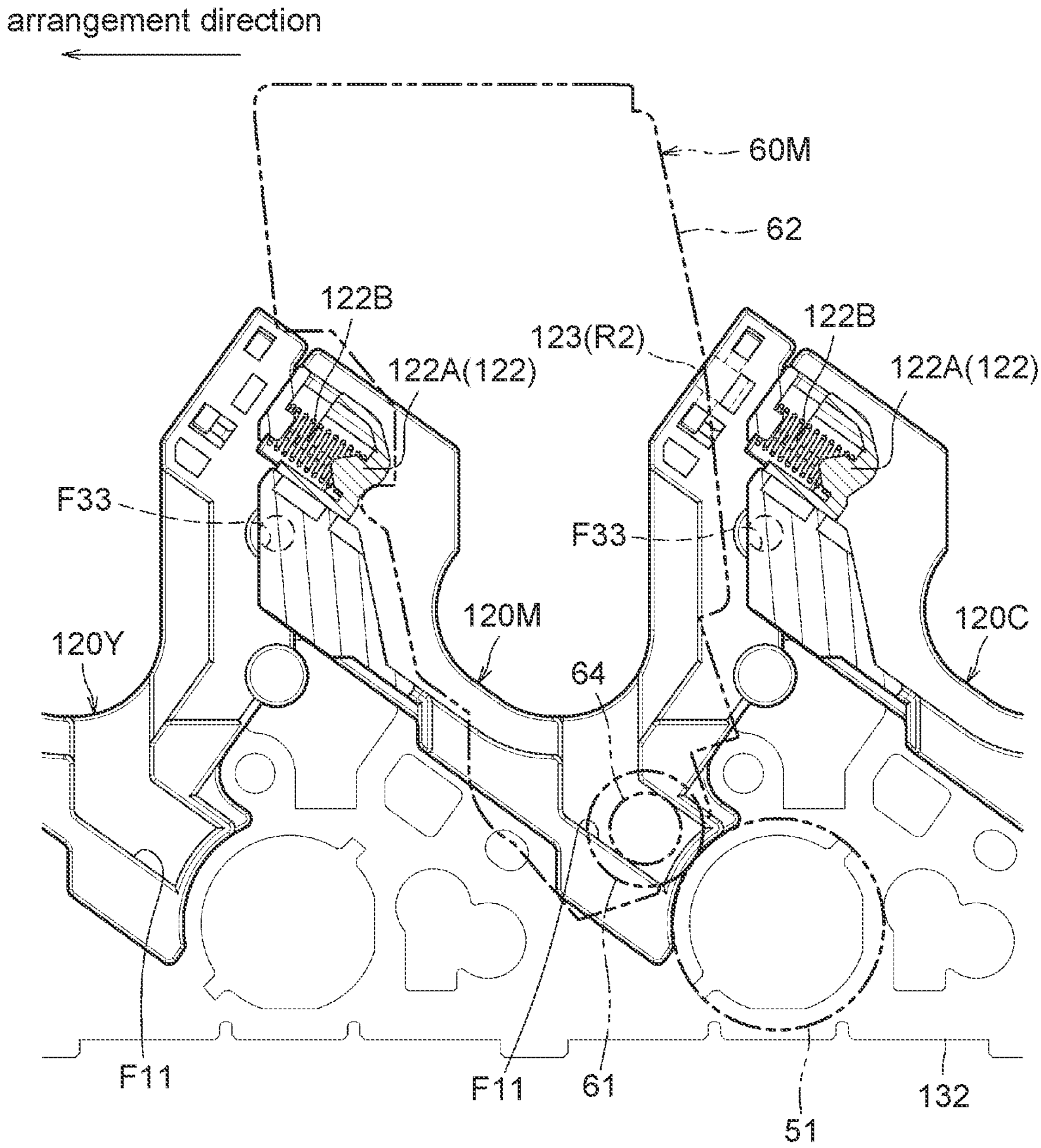
FIG. 16 is a view of the second resin frame viewed from the inside of the drum cartridge when the developing cartridge is located at the contact position.
Figure 17:
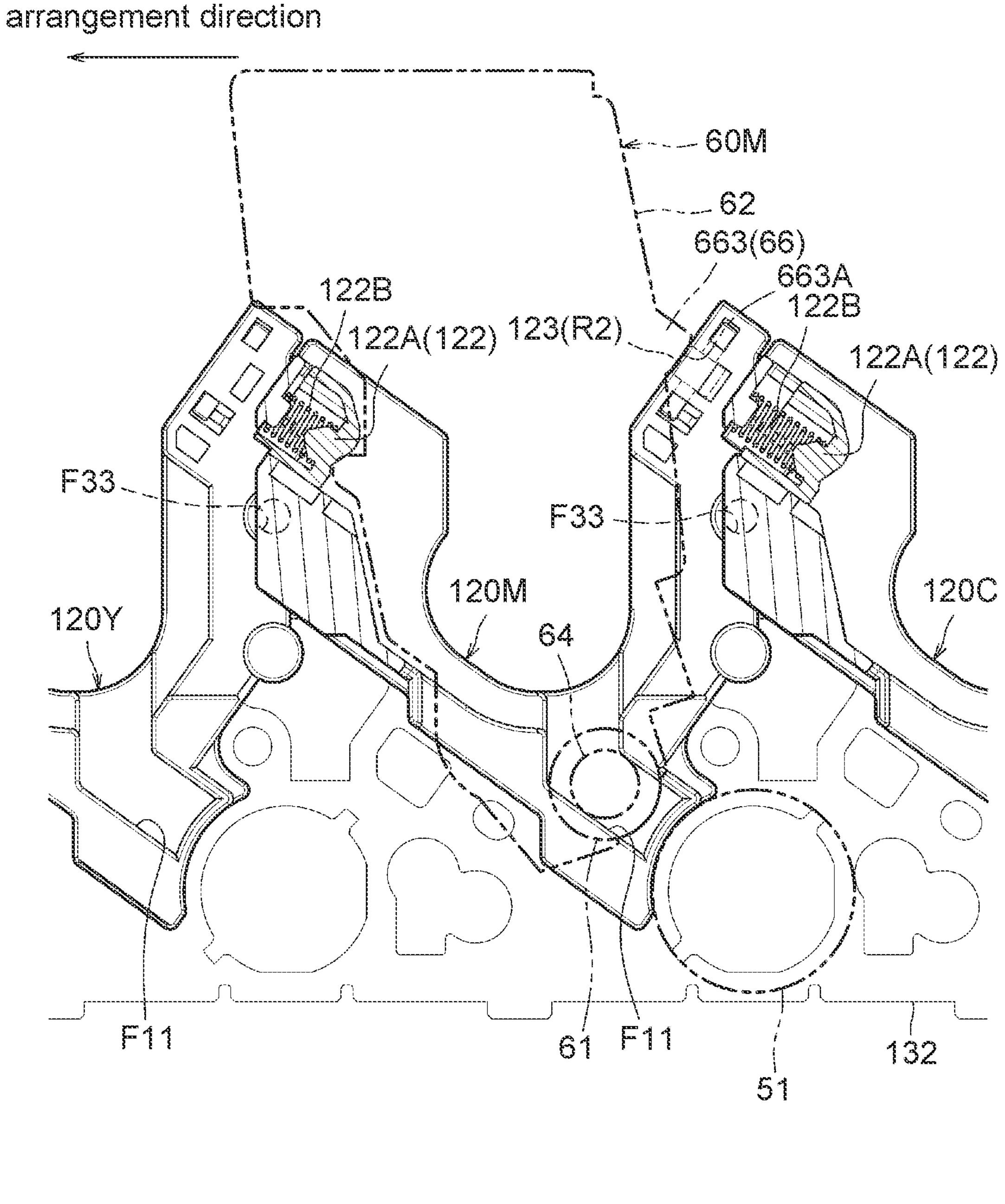
FIG. 17 is a view of the second resin frame viewed from the inside when the developing cartridge is located at the separation position.

The second guide F11 is a groove formed on the inner surface of the plate-shaped portion F1. The second guide F11 is located at a lower portion of the plate-shaped portion F1. As illustrated in FIG. 16, the second guide F11 extends obliquely with respect to the arrangement direction. The second guide F11 positions the developing cartridge 60M at the attachment position when the developing cartridge 60M is attached to the drum frame 53. To be specific, as the developing cartridge 60M is attached to the drum frame 53, the second collar 64 of the developing cartridge 60M enters the second guide F11. When the second collar 64 enters the second guide F11, the developing cartridge 60M is positioned at the attachment position. As illustrated in FIGS. 16 and 17, the second guide F11 guides the second collar 64 as the developing cartridge 60M, which is attached to the drum frame 53, moves between the contact position and the separation position.

As illustrated in FIGS. 15A and 15B, the overlap portion F12 is located at an end portion of the plate-shaped portions F1 on one side in the arrangement direction. The overlap portion F12 includes two protrusions extending in the arrangement direction. When the four second resin frames 120 are assembled to the second metal frame 132, the overlap portion F12 of the second resin frame 120M overlaps the second resin frame 120Y A groove F23 extending in the up-down direction is provided between the overlap portion F12 and the first extending portion F2.

The first extending portion F2 extends from one end portion of the plate-shaped portions F1 in the arrangement direction toward one side in the axial direction. A developing pressing portion 122 is disposed to the first extending portion F2.

Specifically, the first extending portion F2 has a recess F21 open toward the other side in the arrangement direction at an upper portion thereof. The developing pressing portion 122 includes a pressing member 122A and a spring 122B. At least a portion of the pressing member 122A is located in the recess F21. The pressing member 122A is slidably held by the recess F21. The pressing member 122A is slidable along the second guide F11. The spring 122B is located in the recess F21. The spring 122B is located between the pressing member 122A and the bottom of the recess F21. The spring 122B is a compression spring.

The pressing member 122A comes into contact with the developing frame 62 as the developing cartridge 60M is attached to the drum frame 53. Specifically, when the developing cartridge 60M is attached to the drum frame 53, the developing pressing portion 122 presses the developing frame 62 with the urging force of the spring 122B. When the developing pressing portion 122 presses the developing frame 62, the developing roller 61 is pressed toward the photosensitive drum 51.

In addition, the first extending portion F2 has a recess F22 at a lower portion thereof. The support roller 124 is held in the recess F22 rotatably. The support roller 124 supports the developing frame 62 when the developing cartridge 60M is attached to the drum frame 53. In other words, when the developing cartridge 60M is attached to the drum frame 53, the support roller 124 receives the weight of the developing frame 62. The support roller 124 is rotatable while being in contact with the developing frame 62 as the developing cartridge 60M is attached and detached.

The second extending portion F3 extends from the other end portion of the plate-shaped portions F1 in the arrangement direction toward the one side in the axial direction. The second extending portion F3 includes a recess F31, a boss F32, and a fixing hole F33.

A roller R2 is disposed in the recess F31. A portion of the roller R2 is located in the recess F31. The roller R2 is rotatably held by the second resin frame 120M. The roller R2 is rotatable about a rotation axis extending in a direction orthogonal to both the axial direction and a separation direction in which the developing roller 61 moves from the photosensitive drum 51.

An outer peripheral surface of the roller R2 is a second separation contact surface 123 that comes into contact with the separation shaft 66 of the developing cartridge 60M when the developing cartridge 60M moves from the contact position to the separation position. That is, the second separation contact surface 123 is in contact with the separation shaft 66 when the separation shaft 66 is located at the second position.

The boss F32 extends from the second extending portion F3 toward the other side in the axial direction. The boss F32 has a fixing hole F33 opened to the other side in the axial direction. The fixing hole F33 extends in the axial direction. In the fixing hole F33, a screw N for fixing the second resin frame 120 to the second metal frame 132 is inserted. The fixing hole F33 is located at an end portion of the second resin frame 120M on the other side in the arrangement direction.

When the second resin frame 120M indicated by the solid line and the second resin frame 120Y indicated by the two-dot-dash line in FIG. 15A are assembled to the second metal frame 132, the second extending portion F3 of the second resin frame 120Y indicated by the two-dot-dash line enters the groove F23 of the second resin frame 120M.

Figure 18:
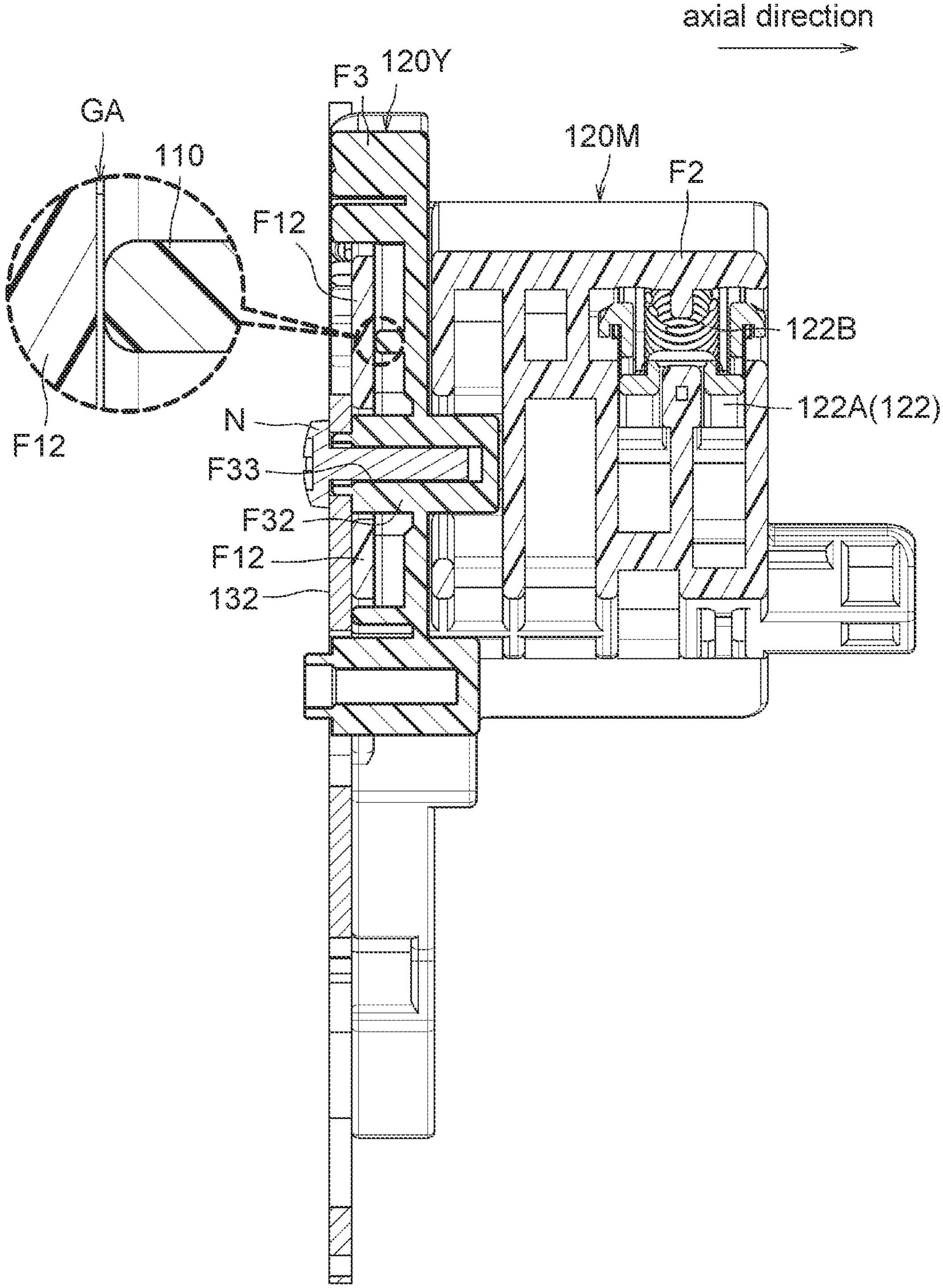
FIG. 18 is a cross-sectional view taken along XVIII-XVIII line in FIG. 15A

As illustrated in FIG. 18, the screw N is inserted into the fixing hole F33 of the second resin frame 120M from the other side in the axial direction, and fixes the second resin frame 120Y to the second metal frame 132. A portion of the second resin frame 120M is located between one end of the second resin frame 120Y and the second metal frame 132. To be specific, the overlap portion F12 of the second resin frame 120M is located between the second resin frame 120Y and the second metal frame 132. In this way, the second resin frame 120M and the second resin frame 120Y overlap each other in the axial direction.

Figure 14:
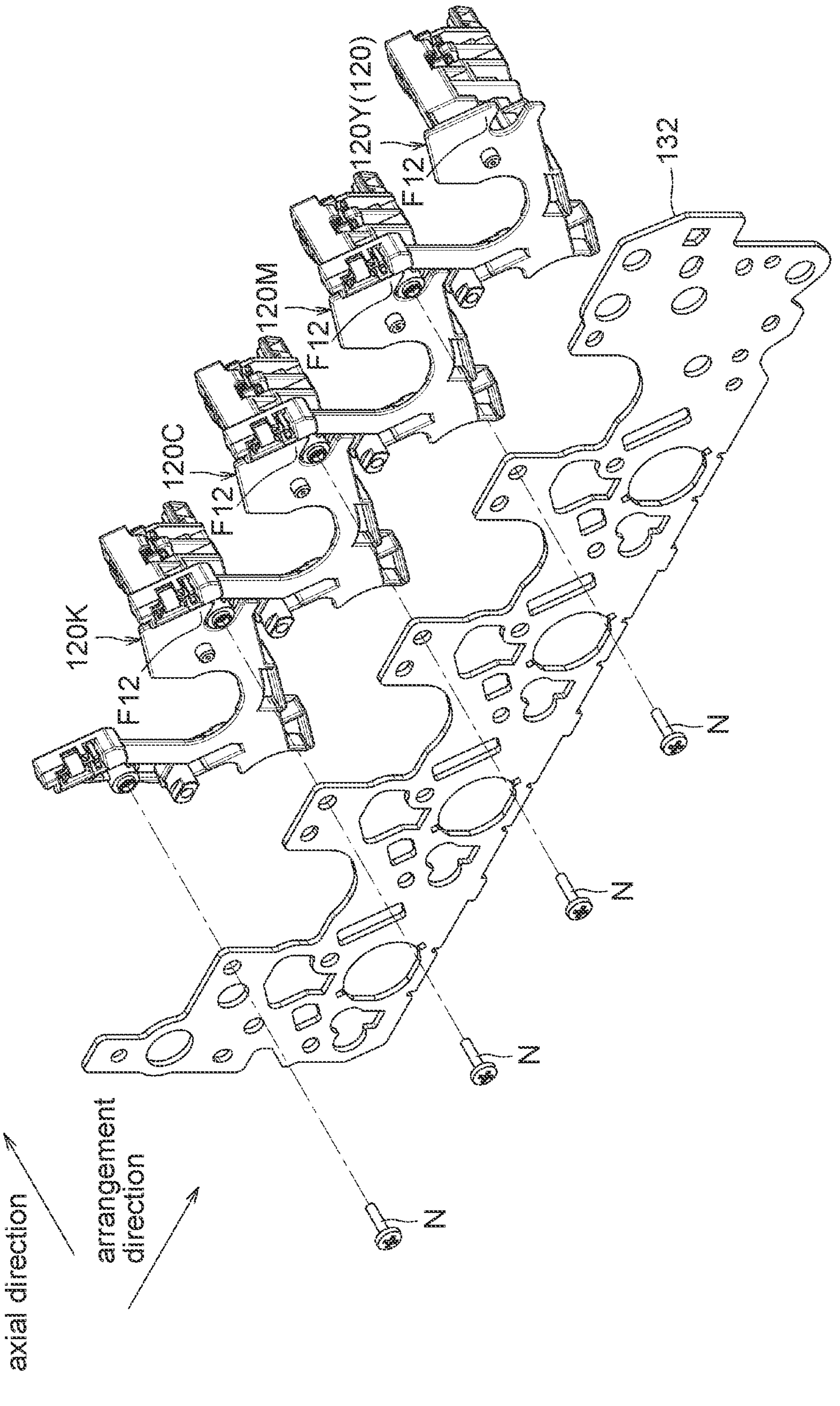
FIG. 14 is a perspective view of a second metal frame and a second resin frame.

As illustrated in FIG. 14, the overlap portion F12 of the second resin frame 120K is located between the second resin frame 120C and the second metal frame 132. In addition, the overlap portion F12 of the second resin frame 120C is located between the second resin frame 120M and the second metal frame 132. Further, the overlap portion F12 of the second resin frame 120Y is located between the first connecting frame PF3 and the second metal frame 132.

Each second resin frame 120 is fixed to the second metal frame 132 with only one screw N at its other end portion in the arrangement direction, and is unfixed at its one end portion. However, since the overlap portion F12 of, for example, the first resin frame 110M is located between its adjacent second resin frame 120Y and the second metal frame 132, the overlap portion F12 is supported by the adjacent second resin frame 120Y if the one end portion of the second resin frame 120M is deformed so as to separate from the second metal frame 132. Therefore, the second resin frame 120 is fixed to the second metal frame 132 with sufficient strength with only one screw N.

As shown in FIG. 18, there is a gap GA in the axial direction between the second resin frame 120M and a portion of the second resin frame 120Y. Thus, the overlap portion F12 of the second resin frame 120M is not held by the second resin frame 120Y and the second metal frame 132. That is, the fastening force of the screw N may not be applied to the overlap portion F12 of the second resin frame 120M.

Next, the separation operation of the developing cartridge 60 will be described. The separation operation is to control whether the developing roller 61 is in contact with the photosensitive drum 51.

As illustrated in FIG. 5A, when the separation shaft 66 is located at the first position, the separation shaft 66 is not in contact with the first resin frame 110 and the second resin frame 120. Specifically, when the separation shaft 66 is located at the first position, the first inclined surface 662A of the first cam 662 is away from the first separation contact surface 113. Similarly, when the separation shaft 66 is located at the first position, the second inclined surface 663A of the second cam 663 is away from the second separation contact surface 123. At this time, since, as illustrated in FIG. 10, the developing frame 62 is pressed toward the photosensitive drum 51 by the pressing of the developing pressing portion 112, the developing roller 61 is in contact with the photosensitive drum 51 and the developing cartridge 60 is at the contact position.

As illustrated in FIG. 5B, as the separation shaft 66 moves from the first position to the second position, the separation shaft 66 moves the developing frame 62 away from the photosensitive drum 51 to move the developing roller 61 from the photosensitive drum 51. To be specific, as the separation shaft 66 moves from the first position to the second position while the pressed surface 663B is pressed by the pressing protrusion, the first inclined surface 662A of the first cam 662 comes into contact with the first separation contact surface 113.

Similarly, as the separation shaft 66 moves from the first position to the second position, the second inclined surface 663A of the second cam 663 comes into contact with the second separation contact surface 123. Then, the first inclined surface 662A comes into contact with the first separation contact surface 113, and the second inclined surface 663A comes into contact with the second separation contact surface 123.

Accordingly, the developing frame 62 moves in a direction away from the photosensitive drum 51. As the developing frame 62 moves in the direction away from the photosensitive drum 51, the developing roller 61 moves away from the photosensitive drum 51. That is, the developing roller 61 is away from the photosensitive drum 51 and the developing cartridge 60 is at the separation position.

As the pressing pin releases the pressing of the pressed surface 663B, the separation shaft 66 slides from the second position to the first position with the pressing force of the compression spring SP. Then, the first inclined surface 662A of the first cam 662 moves away from the first separation contact surface 113. Similarly, the second inclined surface 663A of the second cam 663 moves away from the second separation contact surface 123. As a result, as illustrated in FIG. 10, the developing frame 62 is pressed against the photosensitive drum 51 with the developing pressing portion 112 such that the developing roller 61 comes into contact with the photosensitive drum 51. That is, as the separation shaft 66 moves from the second position to the first position, the developing pressing portion 112 brings the developing frame 62 close to the photosensitive drum 51 to bring the developing roller 61 into contact with the photosensitive drum 51. That is, the developing roller 61 is in contact with the photosensitive drum 51 and the developing cartridge 60 is at the contact position.

According to the drum cartridge 50 described above, the following effects may be obtained.

The developing cartridge 60 attached to the drum cartridge 50 is at the contact position when the image formation is performed, and is at the separation position when the image formation is not performed. In this way, the developing cartridge 60 repeats moving back and forth between the contact position and the separation position. According to the drum frame 53 of the present embodiment, the first guide E11 that guides the developing cartridge 60 and the first separation contact surface 113 that contacts the separation shaft 66 are both disposed on the first resin frame 110. As a result, during the separation operation, the developing cartridge 60 accurately moves with respect to the drum frame 53.

Similarly, the second guide F11 that guides the developing cartridge 60 and the second separation contact surface 123 that contacts the separation shaft 66 are both disposed on the second resin frame 120. As a result, during the separation operation, the developing cartridge 60 accurately moves with respect to the drum frame 53.

In addition, since the first separation contact surface 113 is the outer peripheral surface of the roller R1, the frictional resistance is less as compared with a case where the first separation contact surface is not a roller, and thus the separation operation is smooth. Similarly, since the second separation contact surface 123 is the outer peripheral surface of the roller R2, the frictional resistance is less as compared with a case where the second separation contact surface is not a roller, and thus the separation operation is smooth.

In addition, since the first resin frame 110 has the support roller 114, the separation operation is smooth. Further, since the first resin frame 110 has the support roller 114, the frictional resistance generated when the developing cartridge 60 is attached and detached may be reduced, and the attaching and detaching operation is smooth. Similarly, since the second resin frame 120 has the support roller 124, the separation operation is smooth.

In addition, the first resin frame 110 includes the developing pressing portion 112 that can accurately press the developing cartridge 60 toward the photosensitive drum 51. Similarly, the second resin frame 120 includes the developing pressing portion 122 that can accurately press the developing cartridge 60 toward the photosensitive drum.

In addition, the first resin frame 110 includes the electrical contact 116 with which the developing electrode 65 can be accurately brought into contact.

Four first resin frames 110 are fixed to the first metal frame 131 with four screws N. The overlap portion E12 is located between one end portion of the first resin frame 110 and the first metal frame 131. Therefore, the screws N that are few in number are used for fixing the first resin frames 110 are fixed to the first metal frame 131 with the screws N that are few in number.

There is a gap GA in the axial direction between one first resin frame 110 and another first resin frame 110. Therefore, the overlap portion E12 of the one first resin frame 110 between the another first resin frame 110 and the first metal frame 131 is not tightened in the axial direction. As a result, even when the one first resin frame 110, the another first resin frame 110, or the first metal frame 131 thermally expands, a portion of the one first resin frame 110 that is located between the another first resin frame 110 and the first metal frame 131 may move.

Similarly, the four second resin frames 120 are fixed to the second metal frame 132 with four screws N. In this case, the overlap portion F12 is located between one end portion of the second resin frame 120 and the second metal frame 132. Therefore, the screws N that are few in number are used for fixing the second resin frames 120 to the second metal frame 132.

Similarly, there is a gap GA in the axial direction between one second resin frame 120 and another second resin frame 120. Therefore, the overlap portion F12 between the another second resin frame 120 and the second metal frame 132 is not tightened in the axial direction. As a result, even when the one second resin frame 120, the another second resin frame 120, or the second metal frame 132 thermally expands, a portion of the one second resin frame 120 that is located between the another second resin frame 120 and the second metal frame 132 may move.

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described disclosure are provided below.

Figure 19:
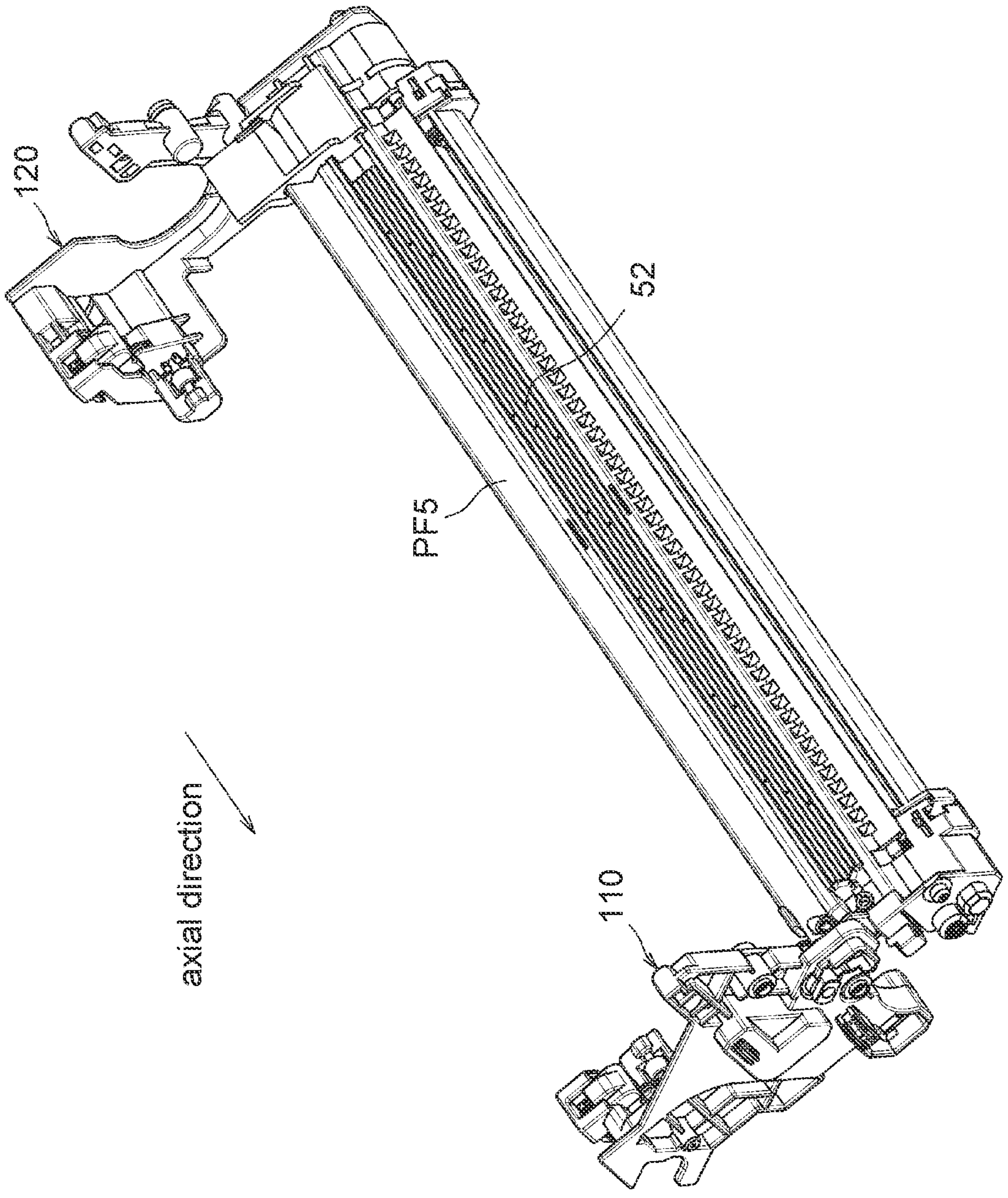
FIG. 19 is a perspective view of a first resin frame and a second resin frame according to another embodiment.

As illustrated in FIG. 19, the charger frame PF5 may be integral with the first resin frame 110 and the second resin frame 120 as a one-piece body.

The four first resin frames may be integrated into a first resin frame as a one-piece body. In this configuration, one first resin frame may include a plurality of first guides and a plurality of first separation contact surfaces corresponding to the plurality of developing cartridges.

Similarly, the four second resin frames may be integrated into a second resin frame as a one-piece body. In this configuration, one second resin frame may include a plurality of second guides and a plurality of second separation contact surfaces corresponding to the plurality of developing cartridges.

The first separation contact surface and the second separation contact surface may be wall surfaces. The wall surfaces may include a flat surface and a curved surface.

The first separation contact surface and the second separation contact surface may have inclined surfaces. Thus, the developing frame may move in the direction away from the photosensitive drum as the separation shaft moves from the first position to the second position even if the first cam and the second cam do not have the inclined surfaces.

The first cam and the second cam may each have a stepped surface, instead of the inclined surface. As the separation shaft moves from the first position to the second position, the stepped surface of the first cam comes into contact with the first separation contact surface, and the stepped surface of the second cam comes into contact with the second separation contact surface, so that the developing frame moves in the direction away from the photosensitive drum.

The number of developing cartridges 60 attached to the drum cartridge 50 may be one to three, or five or more.

Further, the image forming apparatus may be a monochrome printer, a copying machine, or a multifunction peripheral.

The elements described in the above-described embodiment and modifications may be appropriately combined and implemented.

What is claimed is:

1. A drum cartridge, comprising:
- a photosensitive drum rotatable about a drum axis extending in an axial direction; and
- a drum frame holding the photosensitive drum and configured to hold a developing cartridge, the drum frame including:
  - a first metal frame located at one end of the drum frame in the axial direction;
  - a second metal frame located at the other end of the drum frame in the axial direction; and
  - a first resin frame located between the first metal frame and the second metal frame and attached to an inner surface of the first metal frame,
- wherein the developing cartridge includes:
  - a developing roller rotatable about a developing axis extending in the axial direction;
  - a developing frame holding the developing roller; and
  - a separation shaft held by the developing frame and movable in the axial direction between a first position and a second position, the separation shaft being configured to, when moving from the first position to the second position, move the developing frame away from the photosensitive drum, and, when moving from the second position to the first position, move the developing frame toward the photosensitive drum, wherein the first resin frame includes:

a first guide configured to position the developing cartridge at an attachment position; and a first separation contact surface configured to come into contact with the separation shaft when the separation shaft is located at the second position, and wherein the first resin frame is configured to press the developing frame when the developing cartridge is attached to the drum frame.

2. The drum cartridge according to claim 1, wherein the first resin frame further includes a roller, and the first separation contact surface is an outer circumferential surface of the roller.

3. The drum cartridge according to claim 1, wherein the first resin frame further includes a support roller configured to support the developing frame when the developing cartridge is attached to the drum frame.

4. The drum cartridge according to claim 1, wherein the first resin frame further includes a developing pressing portion configured to press the developing roller toward the photosensitive drum when the developing cartridge is attached to the drum frame.

5. The drum cartridge according to claim 1, wherein the developing cartridge further includes a developing electrode for transferring a bias to the developing roller, and the first resin frame further includes an electrical contact to come into contact with the developing electrode when the developing cartridge is attached to the drum frame.

6. The drum cartridge according to claim 1, wherein the drum frame further includes a second resin frame disposed between the first metal frame and the second metal frame and attached to an inner surface of the second metal frame, and the second resin frame includes:

a second guide configured to position the developing cartridge at the attachment position; and a second separation contact surface configured to come into contact with the separation shaft when the separation shaft is located at the second position.

7. The drum cartridge according to claim 6, further comprising a charger configured to charge the photosensitive drum, wherein the drum frame further includes a charger frame that holds the charger, and the charger frame is integral with the first resin frame and the second resin frame.

8. The drum cartridge according to claim 1, wherein the drum frame is configured to hold a plurality of developing cartridges arranged along the first metal frame and including the developing cartridge, and the first resin frame includes a plurality of first guides including the first guide, and a plurality of first separation contact surfaces including the first separation contact surface, the plurality of first guides and the plurality of first separation contact surfaces corresponding to the plurality of developing cartridges.

9. A drum cartridge, comprising:

a plurality of photosensitive drums, each rotatable about a respective drum axis extending in an axial direction; and a drum frame holding the plurality of photosensitive drums arranged in a particular direction and configured to hold a plurality of developing cartridges, the drum frame including, a first metal frame located at one end of the drum frame in the axial direction, wherein the plurality of developing cartridges are arranged along the first metal frame;

a second metal frame located at the other end of the drum frame in the axial direction; and a first resin frame located between the first metal frame and the second metal frame and attached to an inner surface of the first metal frame;

another first resin frame adjacent to the first resin frame, wherein the first resin frame and the another first resin frame each correspond to a different developing cartridge and are disposed along the first metal frame, wherein each of the developing cartridges includes:

a developing roller rotatable about a developing axis extending in the axial direction, a developing frame holding the developing roller; and a separation shaft held by the developing frame and movable between a first position and a second position, the separation shaft being configured to, when moving from the first position to the second position, move the developing frame away from the photosensitive drum, and, when moving from the second position to the first position, move the developing frame toward the photosensitive drum, wherein the first resin frame includes:

a first guide configured to position the developing cartridge at an attachment position; and a first separation contact surface configured to come into contact with the separation shaft when the separation shaft is located at the second position, wherein the first resin frame has a fixing hole located at one end portion of the first resin frame in the particular direction, and a portion of the another first resin frame is located between the one end portion of the first resin frame and the first metal frame, and a screw for fixing the first resin frame to the first metal frame is inserted into the fixing hole.

10. The drum cartridge according to claim 9, wherein a gap is between the first resin frame and the portion of the another first resin frame in the axial direction.

* * * * *